(12) United States Patent
Lisitcyn et al.

(10) Patent No.: US 12,289,319 B2
(45) Date of Patent: Apr. 29, 2025

(54) METHOD AND A SYSTEM FOR CONTROLLING DISPLAY OF A WEB PAGE

(71) Applicant: YANDEX EUROPE AG, Lucerne (CH)

(72) Inventors: Sergei Lisitcyn, Tolyatti (RU); Olga Smirnova, Saint Petersburg (RU); Roman Ivanov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 130 days.

(21) Appl. No.: 18/218,229

(22) Filed: Jul. 5, 2023

(65) Prior Publication Data
US 2024/0015167 A1    Jan. 11, 2024

(30) Foreign Application Priority Data

Jul. 5, 2022 (RU) ................................ 2022118257

(51) Int. Cl.
*H04L 9/40* (2022.01)
(52) U.S. Cl.
CPC ................................ *H04L 63/126* (2013.01)
(58) Field of Classification Search
CPC .................................................... H04L 63/126
See application file for complete search history.

(56) References Cited

U.S. PATENT DOCUMENTS

| | | | |
|---|---|---|---|
| 7,921,152 B2 | 4/2011 | Ashley et al. | |
| 8,312,543 B1 | 11/2012 | Gardner | |
| 8,701,201 B2 | 4/2014 | Rouhana | |
| 8,793,614 B2 | 7/2014 | Wilson et al. | |
| 8,819,817 B2 | 8/2014 | Croll et al. | |
| 9,363,326 B2 | 6/2016 | Wang et al. | |

(Continued)

FOREIGN PATENT DOCUMENTS

| | | |
|---|---|---|
| CN | 103618761 B | 2/2017 |
| CN | 105490993 B | 12/2019 |

(Continued)

OTHER PUBLICATIONS

Russian Search Report dated May 23, 2024 issued in respect of the counterpart Russian Patent Application No. RU 2024101799.

(Continued)

*Primary Examiner* — Amie C. Lin
(74) *Attorney, Agent, or Firm* — BCF LLP

(57) ABSTRACT

A method and a system for controlling tracking of web-browsing activities of a user in a browser application are provided. The method comprises: receiving, from a given web server, data representative of a web page to be displayed in the browser application; identifying, based on the data, elements of the web page linked to at least one in-use third-party web resource; obtaining in-use data including at least data of past user interactions of the user with the at least one in-use third-party web resource; feeding the in-use data to an MLA to determine a probability value of the user allowing sharing a respective third-party cookie of the at least one in-use third-party web resource therewith while browsing the web page; in response to the probability value being lower than a threshold value, determining that the user is unlikely to allow sharing the respective third-party cookie while browsing the web page.

16 Claims, 9 Drawing Sheets

(56) References Cited

U.S. PATENT DOCUMENTS

| | | | |
|---|---|---|---|
| 10,778,792 | B1 | 9/2020 | Handy Bosma et al. |
| 11,562,298 | B1* | 1/2023 | Bayandin ............... G06N 20/00 |
| 2010/0138437 | A1 | 6/2010 | Nadig et al. |
| 2013/0304906 | A1 | 11/2013 | Yavilevich et al. |
| 2016/0134708 | A1 | 5/2016 | Hansen et al. |
| 2017/0185602 | A1 | 6/2017 | Gusev et al. |
| 2019/0014087 | A1 | 1/2019 | Robinson et al. |
| 2019/0347689 | A1* | 11/2019 | Bullock ............. G06Q 30/0242 |
| 2020/0159765 | A1 | 5/2020 | Manin et al. |
| 2021/0194975 | A1 | 6/2021 | Comstock et al. |
| 2021/0209645 | A1 | 7/2021 | Shishkin et al. |
| 2021/0374205 | A1 | 12/2021 | Volynets et al. |
| 2022/0321600 | A1* | 10/2022 | Celiesius ............ H04L 61/4511 |
| 2024/0160678 | A1* | 5/2024 | Huang .................. G06F 16/906 |

FOREIGN PATENT DOCUMENTS

| | | |
|---|---|---|
| CN | 108124014 B | 9/2020 |
| RU | 2634218 C2 | 10/2017 |
| RU | 2714594 C1 | 2/2020 |
| WO | 0157615 A2 | 8/2001 |

OTHER PUBLICATIONS

Russian Search Report dated Oct. 26, 2023 issued in respect of the counterpart Russian Patent Application No. RU 2022118257.

Wilander, "Intelligent Tracking Prevention", Published on Jun. 5, 2017, retrieved on the internet on Mar. 14, 2022.

"How can I allow cookies for only my specified sites?", https://support.mozilla.org/bm/questions/976723 , retrieved on Mar. 24, 2022.

* cited by examiner

METHOD AND A SYSTEM FOR CONTROLLING DISPLAY OF A WEB PAGE

CROSS-REFERENCE

The present application claims priority to Russian Patent Application No. 2022118257, entitled "Method and a System For Controlling Display of a Web Page", filed Jul. 5, 2022, the entirety of which is incorporated herein by reference.

FIELD

The present technology relates generally to web browsing; and in particular, to a method of and system for controlling tracking of web-browsing activities in a browser.

BACKGROUND

When a user is browsing web pages on a network, such as the Internet, using a browser application (for example, a Yandex.Browser™ browser application, a Google Chrome™ browser application, an Opera™ browser application, and the like), certain web resources can be configured to track their web-browsing activity, such as clicking on certain links/buttons, logging in/off their user accounts, entering (typing in) textual data, and the like. To that end, these web resources can cause the browser application to accept and install, at a user device running the browser application, cookies (also referred to sometimes as "web cookies", "Internet cookies", or "browser cookies"), that is, a block of data specifically configured to enable web servers of such web resources to track the web-browsing activity of the user.

For example, a respective cookie may be sent by a web resource whose given web page the user is currently browsing (also referred to herein as "first-party web page"), that is, a domain's attribute of such a cookie corresponds to the domain name indicated in an address bar of the browser application. Such a cookie is typically referred to as a "first-party cookie".

However, there is an other type of cookies, domain's attributes of which are different from the domain name of the currently browsed web page indicated in the address bar of the browser application, that are referred to as "third-party cookies". Typically, the third-party cookies are transmitted to the user device by respective third-party web resources linked to a given first-party web page that the user is currently browsing, for example, via certain layout elements. For example, a given third-party web resource can be a social network (VK.COM™, for example) and can be linked to the given first-party web page via a Like/Share button or a comment field associated with a content of the given first-party web page. In another example, the given third-party web resource can be an e-commerce platform, being in a commercial partnership with the given first-party web page, and can thus be linked thereto via an advertisement banner or a link redirecting the user to a web page of this e-commerce platform.

Thus, the so transmitted third-party cookies can be accepted by the browser application and used to transmit the data of the web-browsing activity of the user to a respective third-party web server of the given third-party web resource, which can pose risks for the online privacy of the user and for the data thereof. Also, the respective third-party server can be configured to use the data of the web-browsing activity for commercial purposes, such as providing online ads targeting the user, and the like, which can affect user experience of the user.

Certain prior art approaches have been proposed to block the third-party cookies to tackle the above-identified technical problem.

U.S. Pat. No. 10,778,792-B1, issued on Sep. 15, 2020, assigned to International Business Machines Corp, and entitled "PROVIDING USER CONTROL OF TRACKING USER BEHAVIOR" discloses a method, system and computer program product for providing user control of tracking user behavior. A request from a tracking implementer (e.g., website) for installing content (e.g., tracking cookies) on a user's computing device for tracking user behavior is detected. Alternatively, the installation of content by the tracking implementer on the user's computing device to track user behavior is detected. If the user had previously established a standard terms of service for the tracking implementer to abide in order to track the user's behavior, then a determination is made as to whether the tracking implementer agreed to accept such standard terms of service. If the tracking implementer did not agree to accept such standard terms of service, then the tracking implementer is blocked from tracking the user's online behavior, including blocking the tracking implementer from installing content on the user's computing device to track the user's behavior.

Chinese Patent No.: 108,124,014-B, issued on Sep. 22, 2020, assigned to Casic Wisdom Industrial Development Co LTD, and entitled "METHOD FOR INTELLIGENTLY PREVENTING THIRD-PARTY COOKIE TRACKING OF BROWSER" discloses a method for intelligently preventing third-party Cookie tracking by a browser. According to the method, the browser limits the Cookie of the third party and the website data, related Cookie information is deleted intelligently, the cross-site tracking behavior of the Cookie information is prevented, and privacy sensitive data of a user in network activities are protected. Therefore, by adopting the method provided by the embodiment of the invention, the user does not need to manually clear the remaining Cookie data after browsing the web page every time, and the browser can intelligently clear the data for the user. The browser only can store the Cookie data of the website which is actually interacted with by the user for a long time, and the tracked Cookie data can be deleted, so that the privacy of the user is greatly protected from being stolen.

SUMMARY

Therefore, there is a need for systems and methods which avoid, reduce or overcome the limitations of the prior art.

Developers of the present technology have appreciated that a recommendation can be made to the user to either accept or decline the third-party cookies based on past user interactions of the user with the given third-party web resource. More specifically, the developers have devised the non-limiting embodiments of the methods and systems directed to training a machine-learning algorithm (MLA) to determine, based at least on the past user interactions with the given third-party web resource, if the user is likely to accept or decline the third-party cookies from the given third-party web resource. In other words, the present methods and systems are directed to training the MLA to determine, based on the past user interactions, if the user perceives the given third-party web resource as being trustworthy or untrustworthy to accept the third-party cookies from or not.

Further, in at least some non-limiting embodiments of the present technology, the present methods can include generating a respective notification advising whether the user accept or decline the third-party cookie form the given third-party web resource. For example, in certain non-limiting embodiments of the present technology, the user can be prompted to decide whether to accept or decline the third-party cookie from the given third-party web resource only in response to determining that the user is likely to decline receipt of the third-party cookie.

Thus, non-limiting embodiments of the present technology are directed to a user-customized approach to accepting or declining the third-party cookies, which may allow improving the user experience from browsing and improve the online privacy thereof.

More specifically, in accordance with a first broad aspect of the present technology, there is provided a computer-implementable method for controlling tracking of web-browsing activities executed by a target user in a browser application. The method is executable by an electronic device running the browser application. The electronic device is communicatively coupled to a server executing a machine-learning algorithm (the MLA). The MLA has been trained, by the server, to determine respective probability values of a given in-use user allowing sharing third-party cookies of in-use third-party web resources therewith while browsing respective in-use web pages, the respective in-use web pages having elements linked to in-use third-party web resources. The MLA has been trained based on a training set of data including a plurality of training objects. A given training object of the plurality of training objects comprises: (i) training third-party web resource-specific data of a training third-party web resource, the training third-party web resource being linked to a respective training web page; (ii) training user-specific data of a given training user browsing the respective training web page, the training user-specific data including data of past user interactions of the given training user with the training third-party web resource; and (iii) a respective label indicative of whether the given training user has allowed or refused sharing a respective training third-party cookie of the training third-party web resource with the training third-party web resource while browsing the given training web page including elements linked to the training third-party web resource, the respective third-party cookie having been previously received by a training electronic device of the given training user. The method comprises: receiving, by the electronic device, from a given web server, data representative of an in-use web page to be displayed in the browser application; identifying, by the electronic device, based on the data representative of the in-use web page, elements thereof linked to at least one in-use third-party web resource, a given element being configured to transmit data of interactions therewith to a respective third-party web server hosting the at least third-party web resource, different from the given web server; obtaining, by the electronic device, in-use data including at least one of: (i) user-specific data of the target user including data of past user interactions of the target user with the at least one in-use third-party web resource; and (ii) third-party web resource-specific data of the at least one in-use third-party web resource; feeding, by the electronic device, the in-use data to the MLA to determine the respective probability value of the target user allowing sharing a respective in-use third-party cookie of the at least one in-use third-party web resource with the at least one in-use third-party web resource while browsing the in-use web page, the respective in-use third-party cookie enabling the respective third-party server to track the web-browsing activities executed by the target user in the browser application, the respective in-use third-party cookie having been previously received by the electronic device of the target user, the respective probability values of allowing sharing the respective in-use third-party cookie of the at least one in-use third-party web resource by the target user and by an other target user being different; in response to the respective probability value being lower than a threshold probability value: determining, by the electronic device, that the target user is unlikely to share the respective in-use third-party cookie with the at least one in-use third-party web resource while browsing the given in-use web page; and generating, by the electronic device, a first notification advising that the target user refuse sharing the respective in-use third-party cookie with the at least one in-use third-party web resource.

In some implementations of the method, in response to the probability value being lower than the threshold probability value, the method further comprises causing, by the electronic device, the browser application to prevent sharing the respective third-party cookie with the at least one in-use third-party web resource.

In some implementations of the method, in response to the probability value being equal to or greater than the threshold probability value, the method further comprises: determining, by the electronic device, that the target user is likely to allow sharing the respective third-party cookie with the at least one in-use third-party web resource; and generating, by the electronic device, a second notification advising that sharing the respective third-party cookie with the at least one in-use third-party web resource is safe.

In some implementations of the method, the method further comprises: receiving, by the electronic device, an indication of a user action of the target user responsive to a given one of the first notification and the second notification; and in response to the user action not corresponding to the given one of the first notification and the second notification, storing, by the electronic device, the indication of the user action for updating the training set of data for training the MLA.

In some implementations of the method, in response to the probability value being equal to or greater than the threshold probability value, the method further comprises causing, by the electronic device, the browser application to share the respective third-party cookie from the at least one in-use third-party web resource.

In some implementations of the method, the training third-party web resource data includes at least one of: a domain zone of the training third-party web resource; a domain name of the training third-party web resource; and a category of the training third-party web resource.

In some implementations of the method, the category of the training third-party web resource comprises at least one of: (i) a social network; (ii) a news portal; and (iii) a video hosting platform.

In some implementations of the method, the user-specific data of the target user further includes data of a current location of the target user.

In some implementations of the method, the server is communicatively coupled to an other electronic device of the other target user, different from the electronic device, the other electronic device running an other browser application. The other electronic device is configured to execute: receiving, by the other electronic device, from the given web server, data representative of the in-use web page to be displayed in the other browser application; identifying, by the other electronic device, based on the data representative of the in-use web page, the elements thereof linked to the at least one in-use third-party web resource; obtaining, by the other electronic device, other in-use data including at least one of: (i) other user-specific data of the other user including data of past user interactions of the other target user with the at least one in-use third-party web resource; and (ii) the third-party web resource-specific data of the at least one in-use third-party web resource; feeding, by the other electronic device, the other in-use data to the MLA to determine an other respective probability value of the other target user allowing sharing the respective in-use third-party cookie with the at least one in-use third-party web resource while browsing the in-use web page, the respective in-use third-party cookie enabling the respective third-party server to track the web-browsing activities executed by the other user in the other browser application, the respective in-use third-party cookie having been previously received by the other electronic device of the other target user, the other respective probability value of allowing sharing the respective in-use third-party cookie with the at least one in-use third-party web resource by the other target user being different from the respective probability value determined for the target user; and in response to the other respective probability value being lower than the threshold probability value: determining, by the other electronic device, that the other target user is unlikely to allow sharing the respective in-use third-party cookie with the at least one in-use third-party web resource while browsing the given in-use web page; and generating, by the other electronic device, the first notification advising that the other target user refuse sharing the respective in-use third-party cookie with the at least one in-use third-party web resource.

In some implementations of the method, the MLA is a CatBoost decision tree-based MLA.

Further, in accordance with a second broad aspect of the present technology, there is provided a computer-implementable method for controlling tracking of web-browsing activities executed by a user in a browser application. The method is executable by a processor of an electronic device running the browser application. The method comprises: receiving, by the processor, from a given web server, data representative of a web page to be displayed in the browser application; identifying, by the processor, based on the data representative of the web page, elements thereof linked to at least one third-party web resource, a given element being configured to transmit data of interactions therewith to a respective third-party web server hosting the at least third-party web resource, different from the given web server; obtaining, by the processor, (i) user-specific data of the user including data of past user interactions of the user with the at least one third-party web resource; and (ii) third-party web resource-specific data of the at least one third-party web resource; feeding, by the processor, the user-specific data and the third-party web resource-specific data to a machine-learning algorithm (MLA) to determine a respective probability value of the user allowing sharing a respective third-party cookie with the at least one third-party web resource while browsing the web page, the respective in-use third-party cookie having been previously received by the electronic device of the user the respective third-party cookie enabling the respective third-party server to track the web-browsing activity executed by the user in the browser application; the MLA having been trained to determine respective probability values of the user allowing sharing third-party cookies with third-party web resources while browsing web pages linked thereto based at least on the user-specific data; and respective probability values of allowing sharing the respective third-party cookie with the at least one third-party web resource by the user and by an other user being different; in response to the respective probability value being lower than a threshold probability value: determining, by the processor, that the user is unlikely to allow sharing the respective third-party cookie with the at least one in-use third-party web resource while browsing the web page; and generating, by the processor, a first notification advising that the user refuse sharing the respective third-party cookie with the at least one third-party web resource.

In some implementations of the method, in response to the respective probability value being lower than the threshold probability value, the method further comprises causing, by the processor, the browser application to prevent sharing the respective third-party cookie with the at least one third-party web resource.

In some implementations of the method, in response to the respective probability value being equal to or greater than the threshold probability value, the method further comprises:
    determining, by the processor, that the user is likely to allow sharing the respective third-party cookie with the at least one third-party web resource; and generating, by the processor, a second notification advising that sharing the respective third-party cookie with the at least one third-party web resource is safe.

In some implementations of the method, the method further comprises: receiving, by the processor, an indication of a user action of the user responsive to a given one of the first notification and the second notification; and in response to the user action not corresponding to the given one of the first notification and the second notification, storing, by the processor, the indication of the user action associated with the at least one third-party web resource for updating a training set of data having been used for training the MLA.

In some implementations of the method, in response to the probability value being equal to or greater than the threshold probability value, the method further comprises causing, by the processor, the browser application to share the respective third-party cookie with the at least one third-party web resource.

In some implementations of the method, the user-specific data comprises at least one of: (i) data of a current location of the user; and (ii) data of past user interactions of the user with the at least one third-party web resource.

In some implementations of the method, the data of the past user interactions of the user with the at least one third-party web resource comprises at least one of: (i) a number of visits to the at least one third-party web resource by the user over a predetermined period; and (ii) a total number of visits to the at least one third-party web resource by the user.

In some implementations of the method, the third-party web resource-specific data comprises at least one of: (i) a domain zone of the at least one third-party web resource; (ii) a domain name of the at least one third-party web resource; and (iii) a category of the at least one third-party web resource.

In some implementations of the method, the category of the training third-party web resource comprises at least one of: (i) a social network; (ii) a news portal; and (iii) a video hosting platform.

In some implementations of the method, the MLA has been trained by a server communicatively coupled to the electronic device based on a training set of data. The training set of data comprises a plurality of training objects. A given training object comprises: (i) training third-party web resource-specific data of a training third-party web resource, the training third-party web resource being linked to a respective training web page; (ii) training user-specific data of a training user browsing the respective training web page including accepted or declined receipt of data of past user interactions of the training user with the training third-party web resource; and (iii) a respective label indicative of whether the training user has allowed or refused sharing a respective training third-party cookie of the training third-party web resource with the training third-party web resource while browsing the given training web page including elements linked to the training third-party web resource, the respective third-party cookie having been previously received by a training electronic device of the given training user;

In some implementations of the method, the training third-party web resource data includes at least one of: a domain zone of the training third-party web resource; a domain name of the training third-party web resource; and a category of the training third-party web resource.

In some implementations of the method, the user and the other user are browsing the in-use web page from different electronic devices.

In some implementations of the method, the MLA is a CatBoost decision tree-based MLA.

Further, in accordance with a third broad aspect of the present technology, there is provided a computer-implemented method for training a machine-learning algorithm (MLA) to determine respective probability values of a given target user allowing sharing third-party cookies of in-use third-party web resources therewith while browsing respective in-use web pages. The respective in-use web pages has elements linked to in-use third-party web resources. The method is executable by a server communicatively coupled to a plurality of training electronic devices. The method comprises: obtaining, by the server, from the plurality of training electronic devices, a plurality of training objects, a given training object comprising: (i) training third-party web resource-specific data of a training third-party web resource, the training third-party web resource being linked to a respective training web page, each one of the training third-party web resource and the respective training web page being hosted by a respective different web server; (ii) training user-specific data of a training user browsing the respective training web page including data of past user interactions of the training user with the training third-party web resource; and (iii) a respective label indicative of whether the training user has allowed or refused sharing a respective training third-party cookie of the training third-party web resource with the training third-party web resource while browsing the respective training web page including elements linked to the training third-party web resource, the respective third-party cookie having been previously received by a training electronic device of the training user; feeding, by the server, the plurality of training objects to the MLA, thereby determining an MLA formula for respective probability values of target users allowing sharing the respective third-party cookie with the in-use third-party web resource; and transmitting, by the server, the MLA formula to at least one target electronic device of a respective target user for determining the respective probability value of the respective target user allowing sharing the respective third-party cookie with the in-use third-party web resource, the respective probability values of the respective target user allowing sharing the respective third-party cookie with the in-use third-party web resource by different target users being different.

In some implementations of the method, the training third-party web resource data includes at least one of: a domain zone of the training third-party web resource; a domain name of the training third-party web resource; and a category of the training third-party web resource.

In some implementations of the method, the category of the training third-party web resource comprises at least one of: (i) a social network; (ii) a news portal; and (iii) a video hosting platform.

In some implementations of the method, the MLA is a CatBoost decision tree-based MLA.

Further, in accordance with a fourth broad aspect of the present technology, there is provided an electronic device for controlling tracking of web-browsing activities executed by a target user in a browser application of the electronic device. The electronic device is communicatively coupled to a server executing a machine-learning algorithm (the MLA). The MLA has been trained, by the server, to determine respective probability values of a given in-use user allowing sharing third-party cookies of in-use third-party web resources therewith while browsing respective in-use web pages, the respective in-use web pages having elements linked to in-use third-party web resources. The MLA has been trained based on a training set of data including a plurality of training objects. A given training object of the plurality of training objects comprises: (i) training third-party web resource-specific data of a training third-party web resource, the training third-party web resource being linked to a respective training web page; (ii) training user-specific data of a given training user browsing the respective training web page, the training user-specific data including data of past user interactions of the given training user with the training third-party web resource; and (iii) a respective label indicative of whether the given training user has allowed or refused sharing a respective training third-party cookie of the training third-party web resource with the training third-party web resource while browsing the given training web page including elements linked to the training third-party web resource, the respective third-party cookie having been previously received by a training electronic device of the given training user. The electronic device comprises: a processor and a non-transitory computer-readable medium storing instructions. The processor, upon executing the instructions, is configured to: receive, from a given web server, data representative of an in-use web page to be displayed in the browser application; identify, based on the data representative of the in-use web page, elements thereof linked to at least one in-use third-party web resource, a given element being configured to transmit data of interactions therewith to a respective third-party web server hosting the at least third-party web resource, different from the given web server; obtain in-use data including at least one of: (i) user-specific data of the target user including data of past user interactions of the target user with the at least one in-use third-party web resource; and (ii) third-party web resource-specific data of the at least one in-use third-party web resource; feed the in-use data to the MLA to determine the respective probability value of the target user allowing sharing a respective in-use third-party cookie of the at least one in-use third-party web resource with the at least one in-use third-party web resource while browsing the in-use web page, the respective in-use third-party cookie enabling the respective third-party server to track the web-browsing activities executed by the target user in the browser application, the respective in-use third-party cookie having been previously received by the electronic device of the target user, the respective probability values of allowing sharing the respective in-use third-party cookie of the at least one in-use third-party web resource by the target user and by an other target user being different; in response to the respective probability value being lower than a threshold probability value: determine that the target user is unlikely to share the respective in-use third-party cookie with the at least one in-use third-party web resource while browsing the given in-use web page; and generate a first notification advising that the target user refuse sharing the respective in-use third-party cookie with the at least one in-use third-party web resource.

In some implementations of the electronic device, in response to the probability value being lower than the threshold probability value, the processor is further configured to cause the browser application to prevent sharing the respective third-party cookie with the at least one in-use third-party web resource.

In some implementations of the electronic device, in response to the probability value being equal to or greater than the threshold probability value, the processor is further configured to: determine that the target user is likely to allow sharing the respective third-party cookie with the at least one in-use third-party web resource; and generate a second notification advising that sharing the respective third-party cookie with the at least one in-use third-party web resource is safe.

Further, in accordance with a fifth broad aspect of the present technology, there is provided a computer-implementable method for controlling tracking of web-browsing activities executed by a target user in a browser application. The method is executable by an electronic device running the browser application. The electronic device is communicatively coupled to a server executing a machine-learning algorithm (the MLA). The MLA has been trained, by the server, to determine respective probability values of a given in-use user accepting receipt of third-party cookies from in-use third-party web resources while browsing respective in-use web pages referring thereto based on a training set of data including a plurality of training objects. A given training object of the plurality of training objects comprises: (i) training third-party web resource-specific data of a training third-party web resource, the training third-party web resource being linked to a respective training web page; (ii) training user-specific data of a given training user browsing the respective training web page, the training user-specific data including data of past user interactions of the given training user with the training third-party web resource; and (iii) a respective label indicative of whether the training user has accepted or declined receipt of a respective training third-party cookie from the training third-party web resource while browsing the given training web page. The method comprises: receiving, by the electronic device, from a given web server, data representative of an in-use web page to be displayed in the browser application; identifying, by the electronic device, based on the data representative of the in-use web page, elements thereof linked to at least one in-use third-party web resource, a given element being configured to transmit data of interactions therewith to a respective third-party web server hosting the at least third-party web resource, different from the given web server; obtaining, by the electronic device, in-use data including at least one of: (i) user-specific data of the target user including data of past user interactions of the target user with the at least one in-use third-party web resource; and (ii) third-party web resource-specific data of the at least one in-use third-party web resource; feeding, by the electronic device, the in-use data to the MLA to determine the respective probability value of the target user accepting receipt of a respective in-use third-party cookie from the at least one in-use third-party web resource while browsing the in-use web page, the respective in-use third-party cookie enabling the respective third-party server to track the web-browsing activities executed by the target user in the browser application, the respective probability values of accepting receipt of the respective in-use third-party cookie from the at least one in-use third-party web resource by the target user and by an other target user being different; in response to the respective probability value being lower than a threshold probability value: determining, by the electronic device, that the target user is unlikely to accept receipt of the respective in-use third-party cookie from the at least one in-use third-party web resource while browsing the given in-use web page; and generating, by the electronic device, a first notification advising that the target user decline receipt of the respective in-use third-party cookie from the at least one in-use third-party web resource.

In some implementations of the method, in response to the probability value being lower than the threshold probability value, the method further comprises causing, by the electronic device, the browser application to decline receipt of the respective third-party cookie from the at least one in-use third-party web resource.

In some implementations of the method, in response to the probability value being equal to or greater than the threshold probability value, the method further comprises: determining, by the electronic device, that the target user is likely to accept receipt of the respective third-party cookie from the at least one in-use third-party web resource; and generating, by the electronic device, a second notification advising that accepting receipt of the respective third-party cookie from the at least one in-use third-party web resource is safe.

In some implementations of the method, the method further comprises: receiving, by the electronic device, an indication of a user action of the target user responsive to a given one of the first notification and the second notification; and in response to the user action not corresponding to the given one of the first notification and the second notification, storing, by the electronic device, the indication of the user action for updating the training set of data for training the MLA.

In some implementations of the method, in response to the probability value being equal to or greater than the threshold probability value, the method further comprises causing, by the electronic device, the browser application to accept receipt of the respective third-party cookie from the at least one in-use third-party web resource.

In some implementations of the method, the training third-party web resource data includes at least one of: a domain zone of the training third-party web resource; a domain name of the training third-party web resource; and a category of the training third-party web resource.

In some implementations of the method, the category of the training third-party web resource comprises at least one of: (i) a social network; (ii) a news portal; and (iii) a video hosting platform.

In some implementations of the method, the user-specific data of the target user further includes data of a current location of the target user.

In some implementations of the method, the server is communicatively coupled to an other electronic device of the other target user, different from the electronic device. The other electronic device runs an other browser application. The other electronic device is configured to execute: receiving, by the other electronic device, from the given web server, data representative of the in-use web page to be displayed in the other browser application; identifying, by the other electronic device, based on the data representative of the in-use web page, the elements thereof linked to the at least one in-use third-party web resource; obtaining, by the other electronic device, other in-use data including at least one of: (i) other user-specific data of the other user including data of past user interactions of the other target user with the at least one in-use third-party web resource; and (ii) the third-party web resource-specific data of the at least one in-use third-party web resource; feeding, by the other electronic device, the other in-use data to the MLA to determine an other respective probability value of the other target user accepting receipt of the respective in-use third-party cookie from the at least one in-use third-party web resource while browsing the in-use web page, the respective in-use third-party cookie enabling the respective third-party server to track the web-browsing activities executed by the other user in the other browser application, the other respective probability value of accepting receipt of the respective in-use third-party cookie from the at least one in-use third-party web resource by the other target user being different from the respective probability value determined for the target user; and in response to the other respective probability value being lower than the threshold probability value: determining, by the other electronic device, that the other target user is unlikely to accept receipt of the respective in-use third-party cookie from the at least one in-use third-party web resource while browsing the given in-use web page; and generating, by the other electronic device, the first notification advising that the other target user decline receipt of the respective in-use third-party cookie from the at least one in-use third-party web resource.

In some implementations of the method, the MLA is a CatBoost decision tree-based MLA.

Further, in accordance with a sixth broad aspect of the present technology, there is provided a computer-implementable method for controlling tracking of web-browsing activities executed by a user in a browser application. The method is executable by a processor of an electronic device running the browser application. The method comprises: receiving, by the processor, from a given web server, data representative of a web page to be displayed in the browser application; identifying, by the processor, based on the data representative of the web page, elements thereof linked to at least one third-party web resource, a given element being configured to transmit data of interactions therewith to a respective third-party web server hosting the at least third-party web resource, different from the given web server; obtaining, by the processor, (i) user-specific data of the user including data of past user interactions of the user with the at least one third-party web resource; and (ii) third-party web resource-specific data of the at least one third-party web resource; feeding, by the processor, the user-specific data and the third-party web resource-specific data to a machine-learning algorithm (MLA) to determine a respective probability value of the user accepting receipt of a respective third-party cookie from the at least one third-party web resource while browsing the web page, the respective third-party cookie enabling the respective third-party server to track the web-browsing activity executed by the user in the browser application; the MLA having been trained to determine respective probability values of the user accepting receipt of third-party cookies from third-party web resources based at least on the user-specific data; and respective probability values of accepting receipt of the respective third-party cookie from the at least one third-party web resource by the user and by an other user being different; in response to the respective probability value being lower than a threshold probability value: determining, by the processor, that the user is unlikely to accept receipt of the respective third-party cookie from the at least one in-use third-party web resource while browsing the given in-use web page; and generating, by the processor, a first notification advising that the user decline receipt of the respective third-party cookie from the at least one third-party web resource.

In some implementations of the method, in response to the respective probability value being lower than the threshold probability value, the method further comprises causing, by the processor, the browser application to decline receipt of the respective third-party cookie from the at least one third-party web resource.

In some implementations of the method, in response to the respective probability value being equal to or greater than the threshold probability value, the method further comprises: determining, by the processor, that the user is likely to accept receipt of the respective third-party cookie form the at least one third-party web resource; and generating, by the processor, a second notification advising that accepting receipt of the respective third-party cookie from the at least one third-party web resource is safe.

In some implementations of the method, the method further comprises: receiving, by the processor, an indication of a user action of the user responsive to a given one of the first notification and the second notification; and in response to the user action not corresponding to the given one of the first notification and the second notification, storing, by the processor, the indication of the user action associated with the at least one third-party web resource for updating a training set of data having been used for training the MLA.

In some implementations of the method, in response to the probability value being equal to or greater than the threshold probability value, the method further comprises causing, by the processor, the browser application to accept receipt of the respective third-party cookie from the at least one third-party web resource.

In some implementations of the method, the user-specific data comprises at least one of: (i) data of a current location of the user; and (ii) data of past user interactions of the user with the at least one third-party web resource.

In some implementations of the method, the data of the past user interactions of the user with the at least one third-party web resource comprises at least one of: (i) a number of visits to the at least one third-party web resource by the user over a predetermined period; and (ii) a total number of visits to the at least one third-party web resource by the user.

In some implementations of the method, the third-party web resource-specific data comprises at least one of: (i) a domain zone of the at least one third-party web resource; (ii) a domain name of the at least one third-party web resource; and (iii) a category of the at least one third-party web resource.

In some implementations of the method, the category of the training third-party web resource comprises at least one of: (i) a social network; (ii) a news portal; and (iii) a video hosting platform.

In some implementations of the method, the MLA has been trained by a server communicatively coupled to the electronic device based on a training set of data, the training set of data comprising a plurality of training objects, a given training object comprising: (i) training third-party web resource-specific data of a training third-party web resource, the training third-party web resource being linked to a respective training web page; (ii) training user-specific data of a training user browsing the respective training web page including data of past user interactions of the training user with the training third-party web resource; and (iii) a respective label indicative of whether the training user has accepted or declined receipt of a respective training third-party cookie from the training third-party web resource while browsing the given training web page.

In some implementations of the method, the training third-party web resource data includes at least one of: a domain zone of the training third-party web resource; a domain name of the training third-party web resource; and a category of the training third-party web resource.

In some implementations of the method, the user and the other user are browsing the in-use web page from different electronic devices.

In some implementations of the method, the MLA is a CatBoost decision tree-based MLA.

In accordance with a seventh broad aspect of the present technology, there is provided a computer-implemented method for training a machine-learning algorithm (MLA) to determine a respective probability value of a given target user accepting receipt of a respective third-party cookie while browsing a given in-use web page. The method is executable by a server communicatively coupled to a plurality of training electronic devices. The method comprises: obtaining, by the server, from the plurality of training electronic devices, a plurality of training objects, a given training object comprising: (i) training third-party web resource-specific data of a training third-party web resource, the training third-party web resource being linked to a respective training web page, each one of the training third-party web resource and the respective training web page being hosted by a respective different web server; (ii) training user-specific data of a training user browsing the respective training web page including data of past user interactions of the training user with the training third-party web resource; and (iii) a respective label indicative of whether the training user has accepted or declined receipt of a respective training third-party cookie from the training third-party web resource while browsing the given training web page; feeding, by the server, the plurality of training objects to the MLA, thereby determining an MLA formula for respective probability values of target users accepting receipt of the respective third-party cookie form the in-use third-party web resource; and transmitting, by the server, the MLA formula to at least one target electronic device of a respective target user for determining the respective probability value of the respective target user accepting receipt of the respective third-party cookie form the in-use third-party web resource, the respective probability values of the respective target user accepting receipt of the respective third-party cookie form the in-use third-party web resource by different target users being different.

In some implementations of the method, the training third-party web resource data includes at least one of: a domain zone of the training third-party web resource; a domain name of the training third-party web resource; and a category of the training third-party web resource.

In some implementations of the method, the category of the training third-party web resource comprises at least one of: (i) a social network; (ii) a news portal; and (iii) a video hosting platform.

In some implementations of the method, the MLA is a CatBoost decision tree-based MLA.

In accordance with an eighth broad aspect of the present technology, there is provided an electronic device for controlling tracking of web-browsing activities executed by a target user in a browser application of the electronic device. The electronic device is communicatively coupled to a server executing a machine-learning algorithm (the MLA). The MLA has been trained, by the server, to determine respective probability values of a given in-use user accepting receipt of third-party cookies from in-use third-party web resources while browsing respective in-use web pages referring thereto based on a training set of data including a plurality of training objects. A given training object of the plurality of training objects comprises: (i) training third-party web resource-specific data of a training third-party web resource, the training third-party web resource being linked to a respective training web page; (ii) training user-specific data of a given training user browsing the respective training web page, the training user-specific data including data of past user interactions of the given training user with the training third-party web resource; and (iii) a respective label indicative of whether the training user has accepted or declined receipt of a respective training third-party cookie from the training third-party web resource while browsing the given training web page. The electronic device comprises: a processor and a non-transitory computer-readable medium storing instructions. The processor, upon executing the instructions, is configured to: receive, from a given web server, data representative of an in-use web page to be displayed in the browser application; identify, based on the data representative of the in-use web page, elements thereof linked to at least one in-use third-party web resource, a given element being configured to transmit data of interactions therewith to a respective third-party web server hosting the at least third-party web resource, different from the given web server; obtain in-use data including at least one of: (i) user-specific data of the target user including data of past user interactions of the target user with the at least one in-use third-party web resource; and (ii) third-party web resource-specific data of the at least one in-use third-party web resource; feed the in-use data to the MLA to determine the respective probability value of the target user accepting receipt of a respective in-use third-party cookie from the at least one in-use third-party web resource while browsing the in-use web page, the respective in-use third-party cookie enabling the respective third-party server to track the web-browsing activities executed by the target user in the browser application, the respective probability values of accepting receipt of the respective in-use third-party cookie from the at least one in-use third-party web resource by the target user and by an other target user being different; in response to the respective probability value being lower than a threshold probability value: determine that the target user is unlikely to accept receipt of the respective in-use third-party cookie from the at least one in-use third-party web resource while browsing the given in-use web page; and generate a first notification advising that the target user decline receipt of the respective in-use third-party cookie from the at least one in-use third-party web resource.

In some implementations of the electronic device, in response to the probability value being lower than the threshold probability value, the processor is further configured to cause the browser application to decline receipt of the respective third-party cookie from the at least one in-use third-party web resource.

In some implementations of the electronic device, in response to the probability value being equal to or greater than the threshold probability value, the processor is further configured to: determine that the target user is likely to accept receipt of the respective third-party cookie from the at least one in-use third-party web resource; and generate a second notification advising that accepting receipt of the respective third-party cookie from the at least one in-use third-party web resource is safe.

In some implementations of the electronic device, the processor is further configured to: receive an indication of a user action of the target user responsive to a given one of the first notification and the second notification; and in response to the user action not corresponding to the given one of the first notification and the second notification, store, in the non-transitory computer readable medium, the indication of the user action for updating the training set of data for training the MLA.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
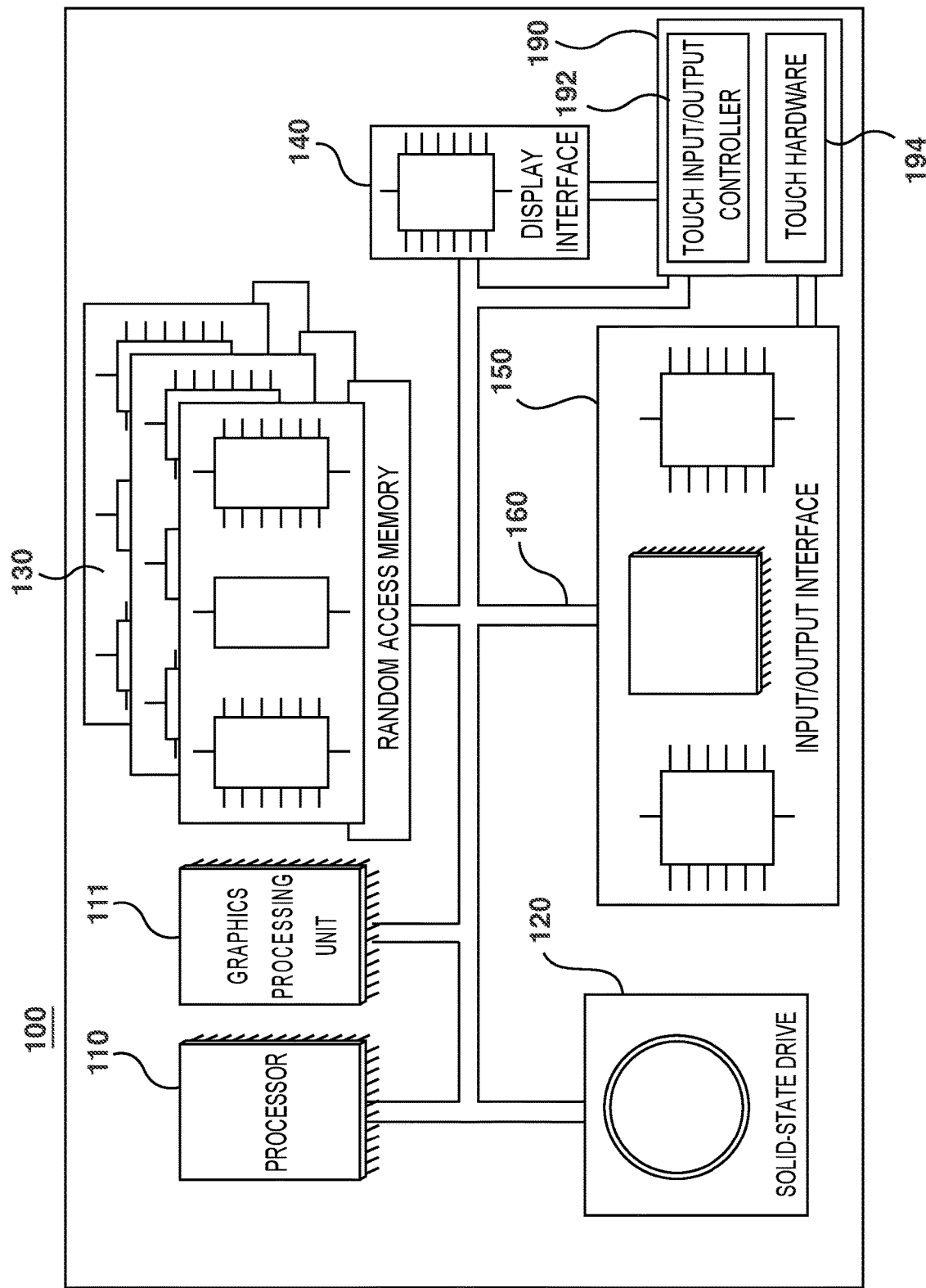
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen—such as a screen (not separately labelled) of a first electronic device 210 depicted in FIG. 2. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
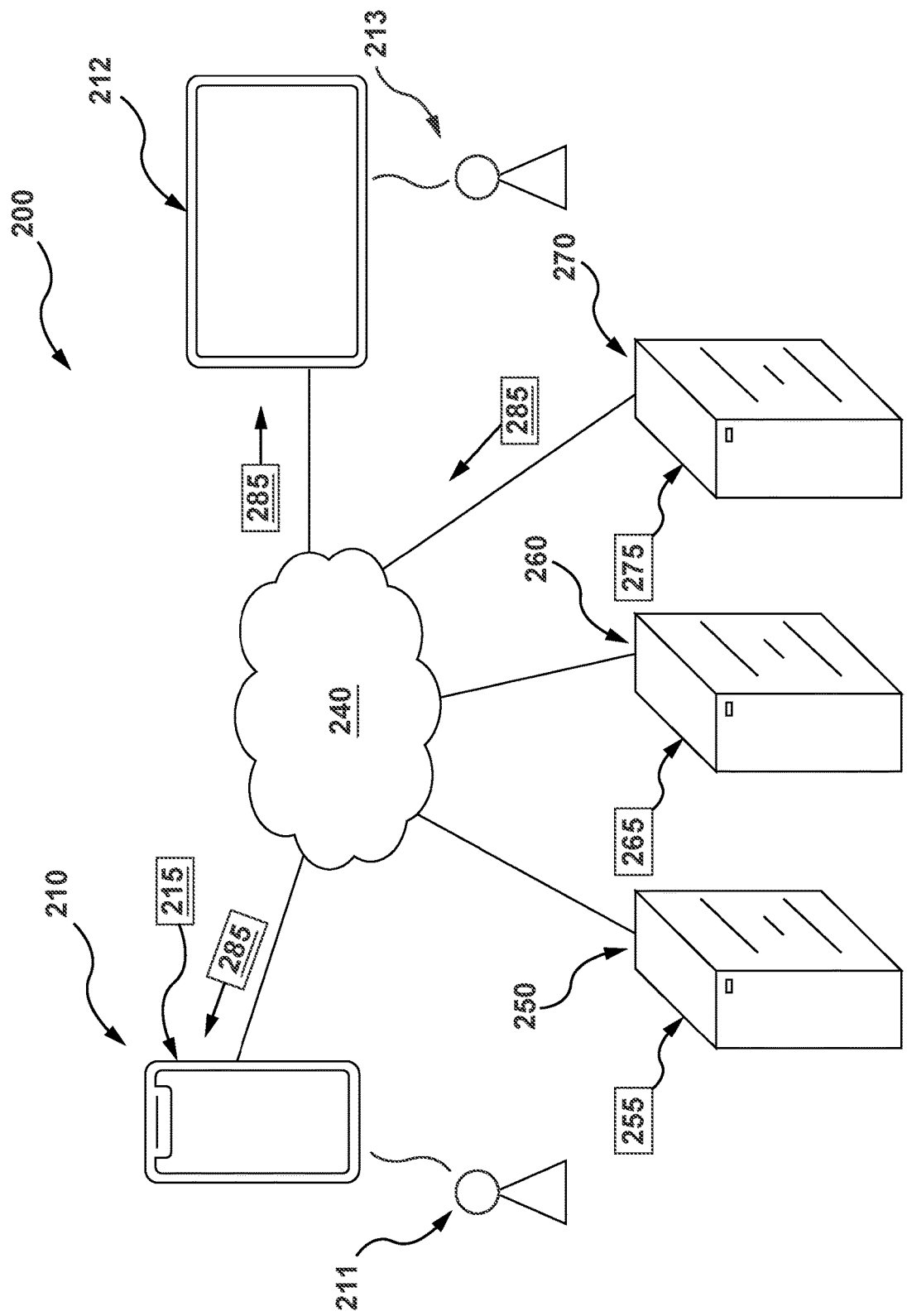
FIG. 2 depicts a schematic diagram of a networked computing environment comprising the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes a first electronic device 210 and a second electronic device 212 communicatively coupled, via a communication network 240, with a first-party web server 250. In some non-limiting embodiments of the present technology, each one of the first electronic device 210 and the second electronic device 212 may be associated with users, such a first user 211 and a second user 213, respectively.

In the non-limiting embodiments of the present technology, a given one of the first electronic device 210 and the second electronic device 212 may be any computer hardware that is capable of running a software appropriate to the relevant task at hand. Thus, some non-limiting examples of the given one of the first electronic device 210 and the second electronic device 212 may include personal computers (desktops, laptops, netbooks, etc.), smartphones, and tablets. Thus, each one of the first electronic device 210 and the second electronic device 212 may comprise some or all components of the computer system 100 depicted in FIG. 1.

In some non-limiting embodiments of the present technology, the first-party web server 250 can be implemented as a conventional computer server and may comprise some or all of the components of the computer system 100 of FIG. 1. In one non-limiting example, the first-party web server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the first-party web server 250 is a single server. In alternative non-limiting embodiments of the present technology (not depicted), the functionality of the first-party web server 250 may be distributed and may be implemented via multiple servers.

According to some non-limiting embodiments of the present technology, the first-party web server 250 can be configured to host a given web resource 255. Broadly speaking, the given web resource 255 may contain and thus provide access to information of various types, such as texts, images, audio, and video organized in at least one web page (such as a given web page 302 depicted in FIG. 3) that is identifiable, in the communication network 240, using, for example, a respective Unique Resource Locator (URL) associated with the at least one page. Examples of the given web resource 255 may include, without limitation, a web site, such as a commercial web site aimed at promoting certain goods, a news portal (such as RIA Novosti™ or CNN™, for example), an online video service (for example, Kinopoisk.ru™), and the like.

Thus, in some non-limiting embodiments of the present technology, a given user using a respective electronic device thereof, such as the first user 211 using the first electronic device 210, may request access to the given web page 302, such as by submitting the associated URL to an address bar (not depicted in FIG. 2) of a browser application 215 running on the first electronic device 210. In another example, the first user 211 can be redirected to the given web page 302 from another web page including a respective link to the given web page 302, on which the first user 211 has clicked, as an example. Further, in response, the first-party web server 250 can be configured to grant access to the first electronic device 210 to the given web page 302 of the given web resource 255 by transmitting a respective digital document representative thereof to the first electronic device 210 for presentation to the first user 211.

In the context of the present specification, the browser application 215 can be a software application run on an electronic device, such as the first electronic device 210, and configured to provide access to resources of nodes of a given network, such as those of the communication network 240, in response to receiving respective network addresses thereof in the given network. In specific non-limiting example, the browser application 215 can be implemented as a Yadex.Browser browser application provided by Yandex LLC of Lev Tolstoy Street, No. 16, Moscow, 119021, Russia.

Further, the respective digital document representative of the given web page 302 may comprise an executable source code, such as that developed in HyperText Markup Language (HTML). However, in other non-limiting embodiments of the present technology, at least a portion of the executable source code can be developed in a different programming language—such as at least one a JavaScript programming language and a Cascading Style Sheets (CSS) programming language.

Thus, having received this digital document, the first electronic device 210 can be configured to cause the browser application 215 to execute the executable source code associated with the given web page 302, thereby rendering, such as by a rendering engine of the browser application 215, a visual representation thereof for presentation thereof to the first user 211.

Figure 3:
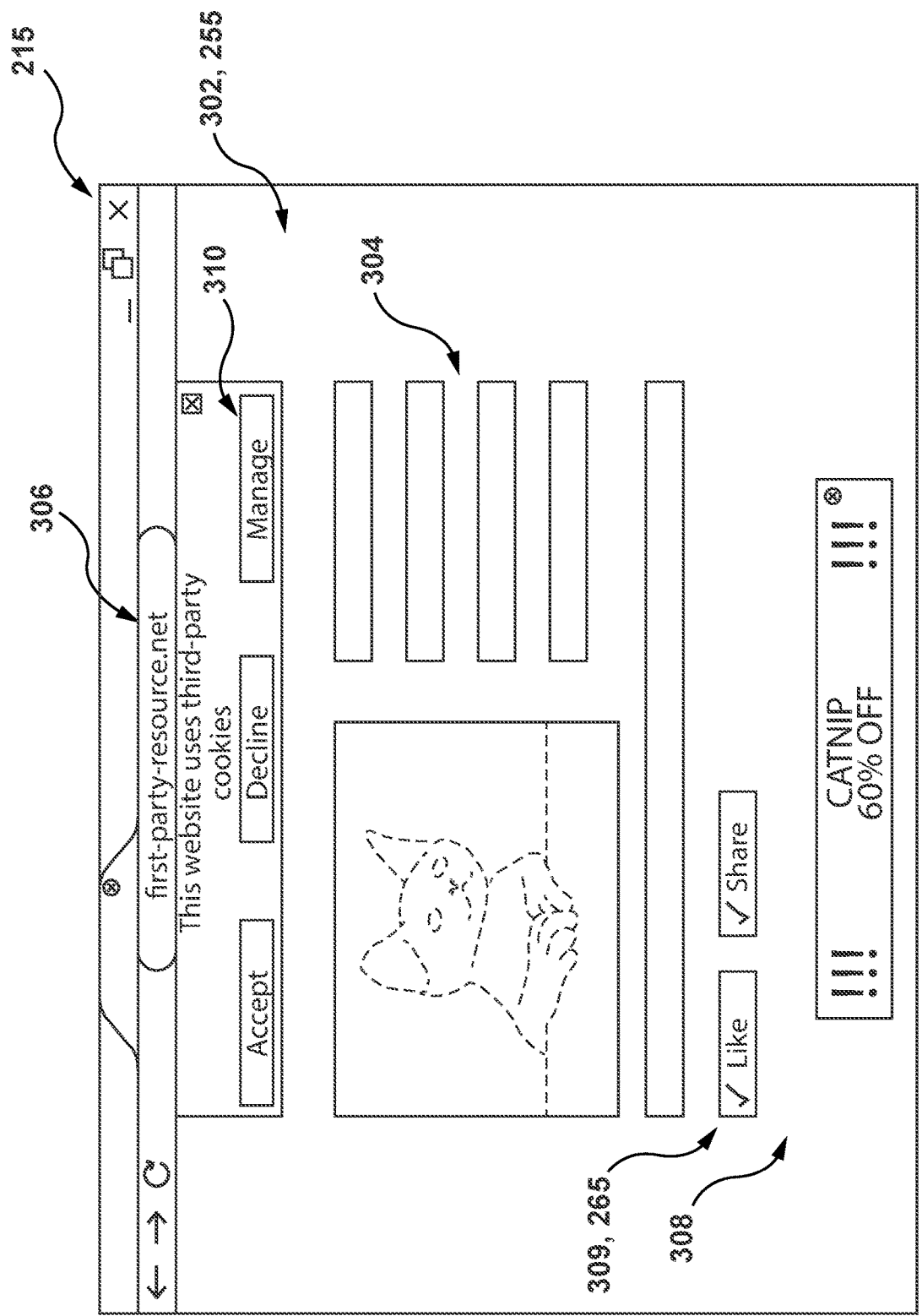
FIG. 3 depicts a schematic diagram of a graphical user interface (GUI) of a browser application run on an electronic device present in the networked computing environment of FIG. 2 and providing a visual representation of a given web page linked to a third-party web resource, in accordance with certain non-limiting embodiments of the present technology.

With continued reference to FIG. 2 and with reference to FIG. 3, there is depicted a graphical user interface (GUI) of the browser application 215 providing the visual representation of the given web page 302, in accordance with certain non-limiting embodiments of the present technology.

As it can be appreciated from FIG. 3, according to certain non-limiting embodiments of the present technology, the given web page 302 can include a plurality of layout elements defining the visual representation thereof. For example, the plurality of layout elements can include inherent layout elements 304 of the given web page 302, that is, those layout elements representative of a substantive content of the given web page 302, provided by the first-party web server 250. However, in some non-limiting embodiments of the present technology, the given web page 302 can include third-party elements 308. More specifically, in these embodiments, a given third-party element 309 of the third-party elements 308 can be representative of at least a portion of a content of a third-party web resource 265 hosted by a third-party web server 260, which is different from the first-party web server 250 hosting the given web resource 255. In other words, the given third-party element 309 can be associated with a domain name of the third-party web server 260 which is different from a first-party domain name 306 of the first-party web server 250 as currently indicated in an address bar (not separately numbered) of the GUI of the browser application 215, as depicted in FIG. 3.

In this regard, as it can be appreciated form FIG. 2, the third-party web server 260 can also be communicatively coupled to the communication network 240. Needless to state that, according to certain non-limiting embodiments of the present technology, the third-party web server 260 can be implemented similarly to the first-party web server 250 and thus can also include all or some of the components of the computer system 100 described above with reference to FIG. 1.

To represent the content from the third-party web server 260, in some non-limiting embodiments of the present technology, the given third-party element 309 of the given web page 302 can be linked to the third-party web resource 265. By "linked", in the context of the present specification, it is meant that the given third-party element 309 can be configured to at least one of: (i) redirect the first user 211 browsing the given web page 302 to a respective web page of the third-party web resource 265 in response to a predetermined interaction of the first user 211 with the given third-party element 309, such as clicking thereon; and (2) transmit, to the third-party web server 260, certain data indicative of interactions with one of the given third-party element 309 only and/or with the given web page 302 in its entirety.

It is not limited which data the given third-party element 309 can be configured to transmit to the third-party web server 260 and generally depends on a type of the third-party web resource 265. In one example where the third-party web resource 265 is a social network (such as a VK.COM™ social network or a OK.RU™ social network, as an example), as depicted in FIG. 3, the given third-party element 309 can be a Like button or a Share button associated with the social network and can thus be configured to transmit thereto data indicative of feedback of the first user 211 browsing the given web page 302 with respect to the content of the given web page 302, such as "liking" or not and/or sharing or not the content of the given web page 302 after appreciation thereof. However, in another example (not depicted), the third-party web resource 265 can be a video hosting platform (such as a YouTube™ video hosting platform, for example), and the given third-party element 309 can be, for example, a built-in video player of the video hosting platform, which can be configured to transmit data thereto indicative, for example, of a number of views of a video content played by the built-in video player. In yet other example where the third-party web resource 265 is a commercial web resource offering certain items, such as goods or services, for sale, as further depicted in FIG. 3, the given third-party element 309 can be an advertising banner which can be configured to transmit, to the commercial web resource, the data such user interactions therewith of the first user 211 as a number of clicks, a dwell time on the advertising banner, a number of hover times over the advertising banner, and the like.

However, it should be expressly understood that the implementation of the given third-party element 309 is not limited to the above examples, and can include other elements linked to third-party web resources and configured to transmit to respective third-party web servers thereof certain data indicative of the user interactions. In specific non-limiting embodiments of the present technology, the given third-party element 309 may even be imperceptible to the first user 211, such as define only a pixel within the visual representation of the given web page 302, and can still be configured to transmit the data indicative of the user interactions with the given web page 302 to the third-party web server 260, as described above.

Further, according to certain non-limiting embodiments of the present technology, the given web resource 255 can be configured to use cookies. Generally speaking, as used herein, a given cookie refers to a block of data transmitted to a user electronic device, such as the first electronic device 210, for example, while a respective user is browsing a web resource, such as the given web page 302 of the given web resource 255. For example, the given cookie can be transmitted to the first electronic device 210 via executing a respective portion of the executable source code of the given web page 302 (such as a JavaScript portion configured to create on the first electronic device 210 the given cookie) or via headers of an HTTP protocol when requesting access to the content of one of the given web page 302 and the third-party web resource 265, such as in response to interacting with given third-party element 309. By doing so, the given cookie can be configured to transmit certain data to the respective web server that has transmitted the cookie to the first electronic device 210.

In various non-limiting embodiments of the present technology, such data can include data of web-browsing activity of the first user 211 further including, for example, without limitation, (i) web-browsing history of the first user 211, (ii) clicking on buttons or following links on various web pages, (iii) search activities executed on search engines (such as a Yandex™ search engine, for example); and (iv) logging in/off on various resources, such as email web services, social networks, and the like. In additional non-limiting embodiments of the present technology, the data that can be transmitted to the respective web server by the given cookie can further include data of the first electronic device 210, including, without limitation (i) a model of the first electronic device 210; (ii) data of an operating system thereof, such as versions, dates of last updates, and the like; (iii) data from sensors of the first electronic device 210, such as GPS data, for example; and others. It should be noted that the above-listed types of data which can be transmitted to the respective web server by using the given cookie is provided only for purposes of explanation; and other types of data are also envisioned without departing from the scope of the present technology.

Further, if a domain attribute of the cookie matches a domain name of the web resource whose page the respective user is currently browsing, such as the first-party domain name 306 of the first-party web server 250, the cookie is referred to as a "first-party cookie", else the cookie is referred to as a "third-party cookie". In other words, returning to the example of FIG. 3, cookies transmitted to the first electronic device 210 by the first-party web server 250 while the first user 211 is browsing the given web page 302 are first-party cookies. By contrast, cookies transmitted to the first electronic device 210 by the third-party web server 260 while the first user 211 is browsing the given web page 302 are third-party cookies.

In some non-limiting embodiments of the present technology, a respective third-party cookie can be transmitted by the third-party web server 260 to the first electronic device 210, for example, in response to the first user 211 interacting with the given third-party element 309 of the given web page 302. To that end, as it can be appreciated, obtaining the above data, via the respective third-party cookie, by the third-party server 260 can raise privacy concerns of the first user 211. Also, the third-party server 260 can use the so obtained data for certain commercial interests, such as providing ads targeting the first user 211 based on their web-browsing activity thereof, for example, which can affect the user experience of the first user 211 from browsing.

In some non-limiting embodiments of the present technology, during parsing the executable source code of the given web page 302, the browser application 215 can be configured to (i) determine that the given web page 302 has the given third-party element 309 linked to the third-party web resource 265; and (ii) generate a notification 310 informing the first user 211 that the given web page 302 can be using third-party cookies, such as the respective third-party cookie from the third-party web server 260. Further, the browser application 215 can be configured to allow the first user 211 set their preferences with respect to third-party cookies from all web resources linked to the given web page 302, and that from the third-party web server 260, in particular. By way of example, and not as a limitation, as it can be appreciated in FIG. 3, following the notification 310, the browser application 215 can be configured to offer the first user 211 one of: (i) accepting receipt of all the third-party cookies transmitted via the given web page 302; (ii) declining receipt of all the third-party cookies transmitted via the given web page 302; or (iii) managing the preferences by selecting web servers from which the third-party cookies are to be accepted or declined.

In other non-limiting embodiments of the present technology, the respective third-party cookie can previously be received by the first electronic device 210 from the third-party server 260. For example, using the communication network 240, the first user 211 could browse other web pages (not depicted) having elements linked to the third-party web resource 265, such as the given third-party element 309, or one of web pages of the third-party web resource 265 itself, and could already accept receipt of the respective third-party cookie from the third-party server 260 at the first electronic device 210. In this case, when the first user 210 is browsing the given web page 302, the third-party server 260 can be configured to (1) determine that the respective third-party cookie thereof has already been received by the first electronic device 211; and (2) further request sharing of the respective third-party cookie therewith to continue tracking the web-browsing activity of the first user 211 across the communication network 240. Further, having received the request for sharing the respective third-party cookie from the third-party server 260, the browser application 215 can be configured to offer the first user 211 similar options as mentioned above: (i) allow sharing all the third-party cookies via the given web page 302; prevent sharing all the third-party cookies via the given web page 302; and (iii) select third-party web resources with which the third-party cookies are to be shared and with which not.

Certain prior art approaches suggest causing the browser application 215 to block any third-party cookies (or sharing thereof) by default. However, blocking all the third-party cookies may result in a limited functionality of certain web resources as some of third-party cookies can be used for implementing some functionalities thereof, such as those associated with web forms, web databases, web banking accounts, and the like, as an example.

Thus, the developers of the present technology have devised methods and systems for determining a probability value of a user, such as the first user 211 or the second user 213, interacting with the third-party web server 260 via the respective third-party cookie thereof. More specifically, in some embodiments, the present methods are directed to determining a probability value of, for example, the first user 211 accepting the respective third-party cookie from the third-party web server 260 while browsing the given web page 302.

However, other non-limiting embodiments of the present technology are directed to determining a probability value of the first user 211 allowing sharing a previously received version of the respective third-party cookie with the third-party web server 260 while browsing the given web page 302.

Therefore, to determine such probability values, the non-limiting embodiments of the present technology are directed to training a machine-learning algorithm (MLA), such as an MLA 275 executed by a training server 270, based on user-specific data of the first user 211, including, for example, past user interactions of the first user 211 with the third-party web resource 265. Further, the present methods include executing, based on one of the probability values, a respective predetermined action, such as a notification advising the first user 211 one of (1) accept or decline receipt of the respective third-party cookie; or (2) allow or refuse sharing the respective third-party cookie with the third-party web server 260, respectively, as will be described below.

By doing so, as will become apparent from the description provided below, the present methods and systems allow determining a user-specific probability value with respect to the respective third-party cookie. For example, if the first user 211 has visited the third-party web resource 265 frequently in the past, they can be advised to accept receipt of the respective third-party cookie from the third-party web server 260, or allow sharing the respective third-party cookie therewith. By contrast, if the first user has never visited the third-party web resource 265, they can be advised to decline receipt of the respective third-party cookie or refuse sharing it with the third-party web server 260. As it can be appreciated, for other users, such as for the second user 213 of the second electronic device 212, the MLA 275, trained as will be described below, can be configured to determine different respective probability values of accepting receipt of/allowing sharing the respective third-party cookie from the third-party web server 260.

As it can be appreciated, the training server 270 can be implemented similarly to one of the first-party web server 250 and the third-party web server 260 and can thus include all or some of the components of the computer system 100 described above with reference to FIG. 1.

It should be noted that it is not limited how the MLA 275 can be implemented; and in various non-limiting embodiments of the present technology can include an MLA implemented based on neural networks (NN), such as convolutional neural networks (CNN) or Transformer-based neural networks, inductive logic programming based MLA, support vector machines based MLA, clustering based MLA, Bayesian networks, and others. However, in certain non-limiting embodiments of the present technology, the MLA 275 can be implemented as a decision tree-based MLA, such as a CatBoost decision-tree based MLA.

In the non-limiting embodiments of the present technology, the MLA 275 may be based on neural networks (NN), such as convolutional NN (CNN), Transformer-based NN, and the like. However, in some non-limiting embodiments of the present technology, the MLA 275 can be implemented based on a decision tree model.

Communication Network

In some non-limiting embodiments of the present technology, the communication network 240 can be the Internet. In alternative non-limiting embodiments of the present technology, the communication network 240 can be implemented as any suitable local area network (LAN), wide area network (WAN), a private communication network, or the like. It should be expressly understood that implementations for the communication network are for illustration purposes only. How a respective communication link (not separately numbered) between each one of the first electronic device 210, the second electronic device 212, the first-party web server 250, the third-party server 260, and the training server 270 and the communication network 240 is implemented will depend, inter alia, on how each one of the first electronic device 210, the second electronic device 212, the first-party web server 250, the third-party server 260, and the training server 270 is implemented. Merely as an example and not as a limitation, in those embodiments of the present technology where the first electronic device 210 is implemented as a wireless communication device such as the smartphone, the communication link can be implemented as a wireless communication link. Examples of wireless communication links include, but are not limited to, a 3G communication network link, a 4G communication network link, and the like. The communication network 240 may also use a wireless connection with the first-party web server 250 and the first electronic device 210, as an example.

Machine-Learning Model Architecture

Figure 4:
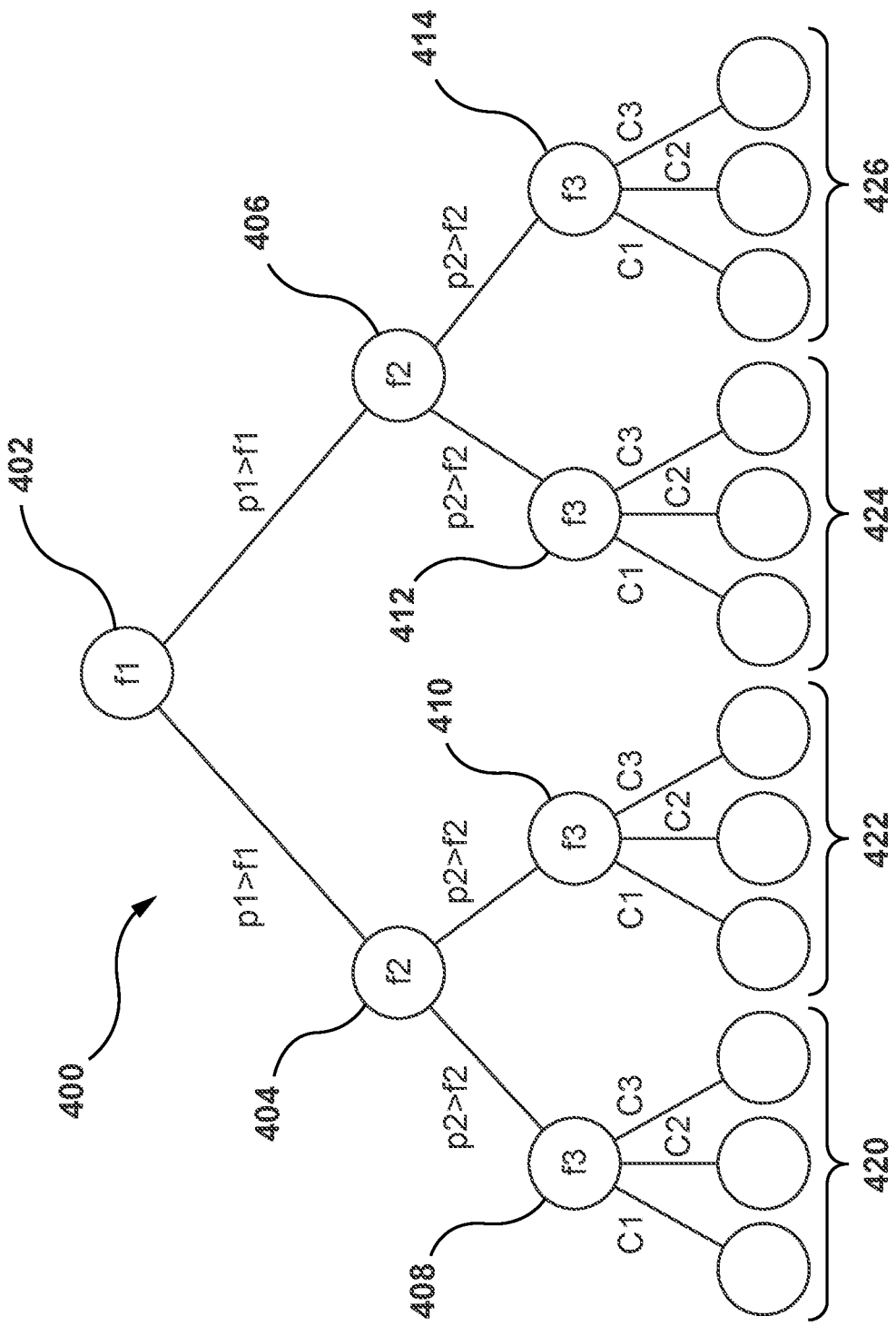
FIG. 4 depicts a schematic diagram of a machine-learning model architecture used for implementation at least some non-limiting embodiments of the present technology.

With reference to FIG. 4, there is depicted a schematic diagram of a decision tree model 400 that can be used with at least some non-limiting embodiments of the present technology. The decision tree model 400 aims at illustrating a generic decision tree model which may be modified so as to meet the requirements of a specific prediction model, such as then MLA 275. Such modifications may include, for example but without being limitative, adding or removing one or more level of the tree, adding or removing nodes (i.e., features and the associated splits), adding or removing branches connecting the nodes and/or the leaves of the tree.

The decision tree model 400 may be a trained tree model. In some embodiments, the decision tree model 400 may, once generated, be updated and/or modified to improve, for example, a level of accuracy of the machine-learning model and/or a scope of application of the machine-learning model. In some embodiments, the decision tree model 400 may be relied upon to determine, for example, but without being limited to, respective probability values of whether certain users, such as the first user 211 and the second user 213, will accept or decline receipt of the respective third-party cookie from the third-party web server 260 while browsing the given web page 302, as will be described below. Other fields in which the decision tree model 400 may be relied upon may also be envisioned without departing from the scope of the present technology.

The decision tree model 400 comprises a first node 402 associated with a first feature "f1". The first node 402 defines a first level of the decision tree model 400. The first node 402 is connected through branches to a second node 404 and a third node 406. The second node 404 and the third node 406 are both associated with a second feature "f2". The second node 404 and the third node 406 define a second level of the decision tree model 400. In an embodiment, the first feature "f1" and the split for the first feature "f1" have been selected amongst a set of features to be positioned at a first level of the decision tree model 400 on the basis of a plurality of training digital objects. For example, a given feature may be indicative of the past user interactions of training users with various first-party and third-party web resources, as will be described below.

The first feature "f1" is defined so that, for a given digital object, a value of a parameter associated with the first feature "f1" determines whether the digital object is to be associated with the second node 404 or the third node 406. As an example, if the value is less than a value "f1" then the digital object is associated with the second node 404. As another example, if the value is more than the value "f1" then the digital object is associated with the third node 406.

In turn, the second node 404 is associated with a fourth node 408 associated with a third feature "f3" and a fifth node 410 associated with the third feature "f3". The third node 406 is associated with a sixth node 412 associated with the third feature "f3" and a seventh node 414 associated with the third feature "f3". The fourth node 408, the fifth node 410, the sixth node 412 and the seventh node 414 define a third level of the decision tree model 400. As previously described in connection with the first node 402, for a given digital object, a value of a parameter associated with the second feature "f2" determines whether the digital object is to be associated with the fourth node 408 or the fifth node 410 (if the digital object is associated with the second node 404) or the sixth node 412 or the seventh node 414 (if the digital object is associated with the third node 406).

In turn, each one of the fourth node 408, the fifth node 410, the sixth node 412 and the seventh node 414 are associated with sets of predicted parameters. In the example illustrated at FIG. 4, the sets of predicted parameters comprise a first set 420, a second set 422, a third set 424 and a fourth set 426. Each one of the sets of predicted parameters comprises three targets, namely "C1", "C2" and "C3", provided, for example, by training users, as will become apparent from the description provided below.

As a person skilled in the art of the present technology may appreciate, the decision tree model 400 illustrates an embodiment wherein a particular level of the decision tree model 400 is associated with one feature. In the example of FIG. 4, a first level comprises the first node 402 and is associated with the first feature "f1"; a second level comprises the second node 404 and the third node 406 and is associated with the second feature "f2"; and a third level comprises the fourth node 408, the fifth node 410, the sixth node 412 and the seventh node 414 and is associated with the third feature "f3".

In other words, in the embodiment of FIG. 4, the first level is associated with the first feature "f1", the second level is associated with the second feature "f2" and the third level is associated with the third feature "f3". Other embodiments may however be envisioned. In particular, an alternative embodiment wherein a generated tree model may include distinct features for a given level of the tree model. For example, a first level of such tree model may comprise a first node associated with a first feature "f1", a second level may comprise a second node associated with a second feature "f2" and a third node associated with a third feature "f3". As a person skilled in the art of the present technology may appreciate, other variations as to which features may be associated with a given level may be envisioned without departing from the scope of the present technology.

Further, how the features, such as the first feature "f1", the second feature "f2", and the third feature "f3", have been selected for generating the decision tree model 400 is not limited. In some non-limiting embodiments of the present technology, selecting the features and thus associated splits between nodes of the decision tree model 400 can include optimizing a respective metric indicative of quality of a given feature to separate, along branches of the decision tree model 400, the plurality of training digital objects, during a training process, as each one of the plurality of training digital objects is fed to the decision tree model 400. In some non-limiting embodiments of the present technology, such a metric can include, without limitation, an Estimate of Positive Correctness metric, a Gini Impurity metric, an Information Gain metric, and the like. In specific non-limiting embodiments of the present technology, the features can be selected based on maximizing a prediction quality parameter of proto-trees making up the decision tree model 400, as described, for example, in a United States Patent Application Publication No.: 2019/164,084-A1, published on May 30, 2019, and entitled "METHOD OF AND SYSTEM FOR GENERATING PREDICTION QUALITY PARAMETER FOR A PREDICTION MODEL EXECUTED IN A MACHINE LEARNING ALGORITHM", content of which is incorporated herein by reference in its entirety.

Further, according to certain non-limiting embodiments of the present technology, the MLA 275 may comprise a single instance of the decision tree model 400, in which case the MLA can be referred to as a single decision tree. However, in other non-limiting embodiments of the present technology, the MLA 275 can include an ensemble of decision trees implemented similarly to the decision tree model 400, in which case the MLA 275 can be referred to as a forest of decision trees. In this case, a final prediction of the ensemble of decision trees is based on prediction outcomes of each decision tree of the ensemble. How the ensemble of decision trees can be built is not limited, and may include, for example, using a boosting approach, such as a gradient boosting approach.

Generally speaking, the boosting is a method of building the ensemble of decision trees, where the trees are built in a stage-wise manner (as opposed to generating a random forest, as an example, where trees can be generated in parallel) such that a difference between targets and prediction outputs of the ensemble of decision trees is minimized, at each iteration, with generating each new decision tree thereof. The difference between the targets and the prediction outcomes of the ensemble of decision trees can be expressed, for example, by a loss function, such as a Cross-Entropy Loss Function.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others.

In other words, by applying the boosting approach, the MLA 275 uses decision trees as week learners, which the MLA 275 sequentially combines in a way that each new learner fits to residuals from a previous iteration, thereby improving an aggregate outcome of the whole ensemble of decision trees. Put another way, each decision tree is built on the same plurality of training digital objects, however training digital objects, in which the first decision tree made "mistakes" in predicting are prioritized when building the decision second tree, etc. Further, the MLA 275 aggregates results from each iteration forming a strong learner.

In specific non-limiting embodiments of the present technology, the MLA 275 can comprise a CatBoost ensemble of decision trees, as described, for example, in an article "*CatBoost: gradient boosting with categorical features support*" by Dorogush et al., and published by YANDEX INC., content of which is incorporated herein by reference in its entirety.

Thus, generally speaking, the processor of the training server 270 and/or the first electronic device 210 can be said to be executing two respective processes in respect of the MLA 275. A first process of the two processes is a training process, where the processor 110 of the training server 270 is configured to train the MLA 275, based on the plurality of training digital objects (also referred to herein as a "training set of data"), to determine the probability value of the first user 211 accepting receipt of the respective third-party cookie from the third-party web server 260 while browsing the given web page 302. The training process will be described in detail below with reference to FIG. 5.

A second process is an in-use process, where the processor 110, for example, of the first electronic device 210, executes the so-trained MLA 275 for determining this probability value and further, based thereon, can be configured to cause the browser application 215 to generate the respective advisory notification for the first user 211. The in-use process will be described in detail below with reference to FIGS. 6 and 7.

According to the non-limiting embodiments of the present technology, both the training process and the in-use process may be executed by the training server 270 and/or the processor 110 of the first electronic device 210 in the networked computing environment 200 described hereinabove.

Training Process

Figure 5:
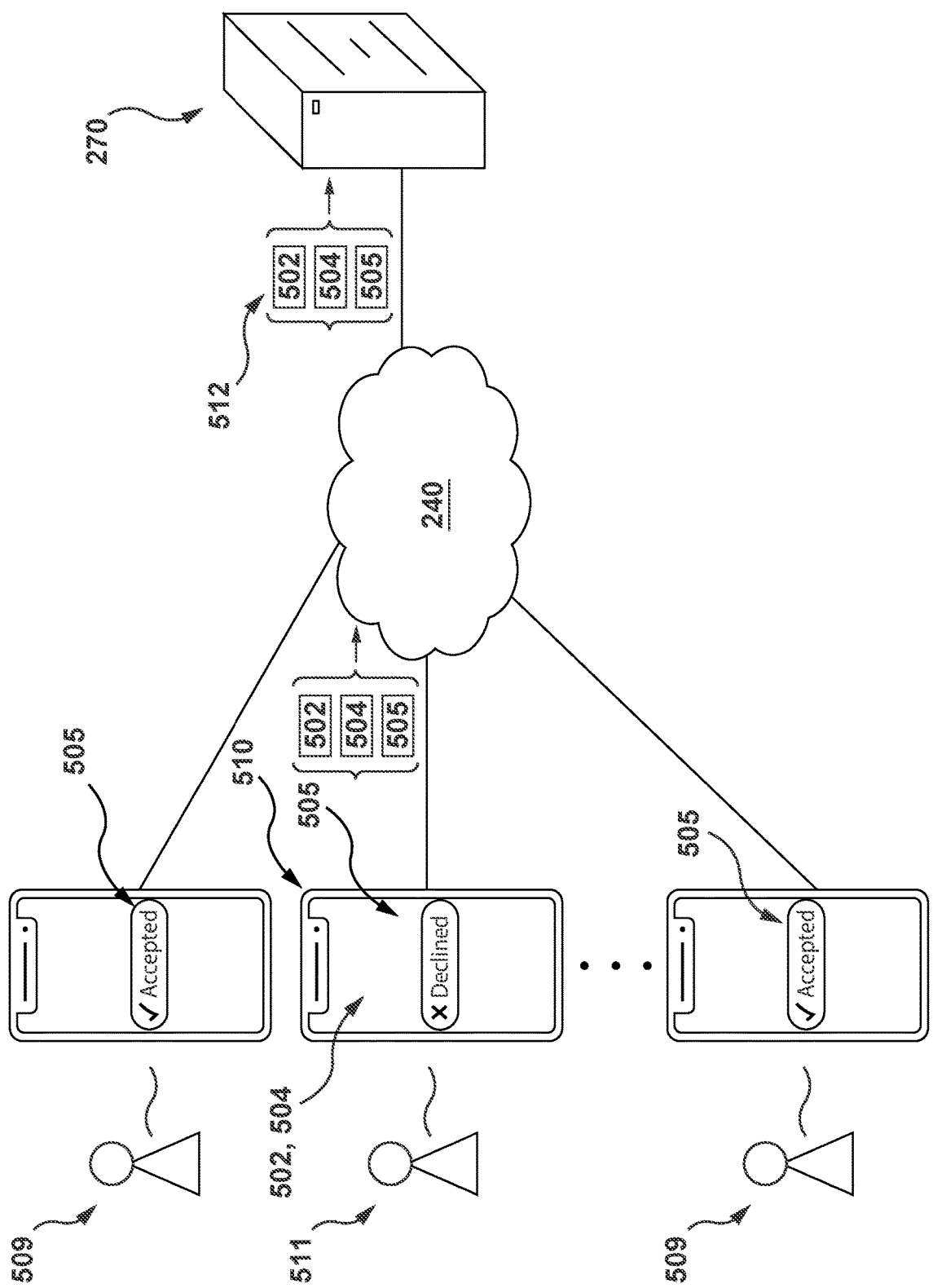
FIG. 5 depicts a schematic diagram of generating a plurality of training digital objects for training the machine-learning model architecture of FIG. 4 to determine a probability value of a user of the electronic device present in the networked computing environment of FIG. 2 accepting a third-party cookie from the third-party web resource wile browsing the given web page of FIG. 3, in accordance with certain non-limiting embodiments of the present technology.

According to certain mon-limiting embodiments of the present technology, the training server 270 can be configured to train the MLA 275 based on the plurality of training digital objects generated based on data of past user interactions of various training users with various training web pages having third-party web resources linked thereto. With reference to FIG. 5, there is depicted a schematic diagram of a step for generating a given training digital object 512 of the plurality of training digital objects, in accordance with certain non-limiting embodiments of the present technology.

As it can be appreciated from FIG. 5, to generate the given training digital object 512, in some non-limiting embodiments of the present technology, the training server 270 can be configured to access a respective training electronic device 510 of a given training user 511 of a plurality of training users 509. In some non-limiting embodiments of the present technology, the plurality training users 509 can be regular users of the communication network 240, such as the first user 211 and the second user 213. However, in other non-limiting embodiments of the present technology, the plurality of training users 509 can be human assessors specifically instructed to visit the training web pages and perform certain interactions therewith, such as accept or decline receipt of respective third-party cookies therefrom, as an example.

Needless to say that the respective training electronic device 510 can be implemented similarly to the first electronic device 210 and the second electronic device 212 described above. Further, as it can be appreciated, the respective training electronic device 510 can also run a browser application implemented similarly to the browser application 215 described above, thereby enabling the given training user 511 to browser various web resources available on the communication network 240.

Thus, in accordance with certain non-limiting embodiments of the present technology, to generate the given training digital object 512, the training server 270 can be configured to: (i) access, via the communication network 240, the respective training electronic device 510; and (ii) obtain therefrom the data of the past user interactions of the given training user 511 with various training web pages, such as a given training web page 502. It is contemplated that the training electronic device 510 may provide data about the given training user 511 to the training server 270, without departing from the scope of the present technology.

Similar to the above, in some non-limiting embodiments of the present technology, the given training web page 502 can include certain third-party elements associated with a respective training third-party web resource 504 linking the respective training third-party web resource 504 to the given training web page 502. It should be expressly understood that it is not limited how the given training web page 502 is implemented, and in certain non-limiting embodiments of the present technology, can be implemented similar to the given web page 302. Further, the respective training third-party web resource 504 can also be implemented similarly to the given third-party web resource 265 as described above with reference to FIG. 3.

Thus, in certain non-limiting embodiments of the present technology, the training server 270 can be configured to generate the given training digital object 512 comprising: (i) training third-party web resource-specific data of the respective training third-party web resource 504, which is linked to the given training web page 502; (ii) training user-specific data of the given training user 511 browsing the given training web page 502; and (iii) a respective label 505 indicative of whether the given training user 511 has accepted or declined receipt of a respective training third-party cookie from the respective training third-party web resource 504 while browsing the given training web page 502.

In accordance with certain non-limiting embodiments of the present technology, the training third-party web resource-specific data of the respective training third-party web resource 504 can include, for example, without limitation, a domain name of the respective training third-party web resource 504; a domain zone of the respective training third-party web resource 504 (such as *.com, *.net, *.org, or a country code like *.ca, *.co.uk, as an example); and a category of the respective training third-party web resource 504, as an example. Further, as noted hereinabove, the category of the respective training third-party web resource 504 can comprise at least one of: (i) social network; (ii) a news portal; and (iii) a video hosting platform, as an example. Other categories of the respective training third-party web resource 504 are also envisioned. Also, it should be expressly understood that the training third-party web resource-specific data can further include other data of the respective training third-party web resource 504, such as a name of a registrar of the respective training third-party web resource 504, a name of a hosting provider of the respective training third-party web resource 504, certain web statistics of the respective training third-party web resource 504, as an example, without departing from the scope of the present technology.

Further, in accordance with certain non-limiting embodiments of the present technology, the training user-specific data of the given training user 511 can include various data of the past user interactions of the given training user 511 with the respective training third-party web resource 504, which may include, for example, but not limited to: (i) a total number of visits of the given training user 511 to the respective training third-party web resource 504; and (ii) a number of visits of the given training user 511 to the respective training third-party web resource 504 over a predetermined period, such as a day, a week, a month, and the like. Other past user interactions of the given training user 511 with the respective training third-party web resource 504, which can be considered as part of the training user-specific data, can include, without limitation: (i) an average time spent by the given training user 511 at the respective training third-party web resource 504 per day, week, month, and the like; (ii) a number of clicks on web pages of the respective training third-party web resource 504 per day, week, month, and the like; (iii) a number of scrolls on the web pages of the respective training third-party web resource 504; and others.

Further, in some non-limiting embodiments of the present technology, the training user-specific data of the given training user 511 can further include data of the past user interactions of the given training user with given training web page 502, which can include similar data to that described above with respect to the given training third-party web resource.

In some non-limiting embodiments of the present technology, the training user-specific data can further include user profile data of the given training user 511, including, for example, but not limited to: an age of the given training user 511, a gender of the given training user 511, user socio-economic parameter of the given training user 511, such as a level of education of, a specialty, an estimate of an average income thereof, and the like.

Further, in some non-limiting embodiments of the present technology, the training user-specific data of the given training user 511 can further include data of the respective training electronic device 510 including, for example, but not limited to: a brand and a model of the respective training electronic device 510; an operating system of the respective training electronic device 510 and its version; data of installed applications on the respective training electronic device 510; data of web pages visited from the respective training electronic device 510 for a predetermined period, such as a day, a week, a month, and the like; data of the browser application(s), such as a type and a version, for example; data from sensors of the respective training electronic device 510, such as that of a GPS sensor thereof allowing determining a current geographical location of the given training user 511, as an example. Use of other data of the respective training electronic device 510 for determining the training user-specific data is also envisioned without departing from the scope of the present technology.

Further, according to certain non-limiting embodiments of the present technology, the respective label 505 can take binary values, such as one of "1" or "0"; "YES" or "NO"; and "ACCEPTED" or "DECLINED", indicative of whether the training user 511 has accepted or declined receipt of the respective third-party cookie associated with the respective training third-party web resource 504.

Further, in some non-limiting embodiments of the present technology, the training server 270 can be configured to assign the respective label 505 only if the given training user 511 has expressly accepted or declined receipt of the respective training cookie form the respective training third-party web resource 504 while browsing the given training web page 502—such as (1) in response to a respective notification generated by the browser application of the given training electronic device 510, for example, similar to the notification 310, as described above; or (2) via preferences of the browser application, as an example. More specifically, in these embodiments, the training server 270 can be configured to discard those training digital objects where respective training third-party cookies are accepted or declined by default setting of browser applications of the respective training electronic devices. However, in other non-limiting embodiments of the present technology, the training server 270 can be configured to consider any fashion of accepting or declining receipt of the respective third-party cookie from the respective training third-party web resource 504 for generating the given training digital object 512, even if the accepting or declining receipt of the respective training third-party cookie has been executed by the browser application of the respective training electronic device 510 with the given training user 511 being unaware thereof Thus, based on the past user interactions of each one of the plurality of training users 509 with various training web pages and training third-party web resources linked thereto, as described above, the training server 270 can be configured to generate the plurality of training digital objects. Further, the training server 270 can be configured to generate, for each one of the plurality of training digital objects, a respective feature vector that the training server 270 can further use for training the MLA 275.

More specifically, to train the MLA 275, according to certain non-limiting embodiments of the present technology, as described above with reference to FIG. 4, the training server 270 can be configured to sequentially descend each one of the plurality of training digital objects through branches of each one of the ensemble of decision trees implemented as described above with reference to FIG. 4. More specifically, by descending the given training digital object 512, the training server 270 can be configured to determine splits between nodes within a given one of the ensemble of decision trees based on features of a respective training feature vector. Further, using, for example, the boosting approach to forming the ensemble of decision trees, as described further above with reference to FIG. 4, the training server 270 can be configured to minimize the loss function between the outputs of the ensemble, at a current iteration of generation thereof, and the targets thereof represented by respective labels assigned to each one of the plurality of training digital objects as described above. Thus, the training server 270 can be configured to expand the ensemble (or the forest) of decision trees until a predetermined difference threshold value of the loss function is reached.

Thus, with back reference to FIG. 2, the training server 270 can be configured to train the MLA 275, thereby determining an MLA formula 285 for the respective probability value of whether a given user of the communication network 240, such as one of the first user 211 and the second user 213, would accept or decline receipt of the respective third-party cookie form the third-party web server 260 while browsing the given web page 302.

However, as mentioned above, in other non-limiting embodiments of the present technology, the training server 270 can be configured to train the MLA 25 to determine the probability value of the first user 211 allowing sharing the respective third-party cookie, previously received by the first electronic device 210, with the third-party web server 260. In these embodiments, the training server 270 can be configured to organize the training data differently. More specifically, instead of the plurality of training digital objects described above, the training server 270 can be configured to generate, based on the data of the past user interactions of the training users, such as the given training user 511 mentioned above, a second plurality of training digital objects, a given training digital object of which differs from the given training digital object 512 only in a configuration of the respective label assigned.

More specifically, the respective label assigned to the given training digital object of the second plurality of training digital objects is indicative of whether the given training user 511 has allowed or refused sharing the respective training third-party cookie, previously received by the given training electronic device 510 from the respective training third-party web resource 504, with the respective training third-party web server thereof, while browsing the given training web page 502.

Further, the training server 270 can be configured to execute the training of the MLA 275 based on the second plurality of training digital objects in a similar fashion described above. Accordingly, as a result of the training of the MLA 275, the training server 270 can be configured to determine a second MLA formula for the respective probability value of whether a given user of the communication network 240, such as one of the first user 211 and the second user 213, would allow or refuse sharing the respective third-party cookie with the third-party web server 260, previously received therefrom, while browsing the given web page 302.

Further, the training server 270 can be configured to transmit the MLA formula 285 to respective electronic devices coupled to the communication network 240 for executing the in-use process, which will now be described with reference to FIGS. 6 and 7.

In-Use Process

With back reference to FIGS. 2 and 3, during the in-use process, according to certain non-limiting embodiments of the present technology, at least one of the first electronic device 210 and the second electronic device 212 can be configured to receive the MLA formula 285 for further use thereof to determine the respective probability value of a respective one of the first user 211 and the second user 213 accepting or declining receipt of the respective third-party cookie from the third-party web server 260 while browsing the given web page 302. More specifically, according to certain non-limiting embodiments of the present technology, the first electronic device 210 can be configured to (i) obtain first in-use data; (ii) generate a first in-use feature vector; (iii) apply, to the first in-use feature vector, the MLA formula 285 to determine a first probability value of whether the first user 211 would accept or decline receipt of the respective third-party cookie; and (iv) based on the first probability value, execute a respective predetermined action.

As it can be appreciated, according to certain non-limiting embodiments of the present technology, the first in-use data can be similar to the training data and can thus include at least one of: (i) first in-use user-specific data of the first user 211, similar to the training user-specific data of the given training user 511 as described above; and (ii) in-use third-party web resource-specific data of the third-party web resource 265 hosted by the third-party web server 260, similar to the training third-party web resource-specific data of the respective training third-party web resource 504, as described above.

Thus, having determined the first probability value associated with the first user 211, in some non-limiting embodiments of the present technology, the first electronic device 210 can be configured to compare the first respective probability value to a predetermined threshold probability value, which can be, for example, one of 0.75, 0.80, or 0.85; and based on this comparison, execute the respective predetermined action. For example, in response to the first probability value being equal to or greater than the predetermined threshold probability value, the first electronic device 210 can be configured to determine that the first user 211 is likely to accept receipt of the respective third-party cookie from the third-party web server 260.

Figure 6:
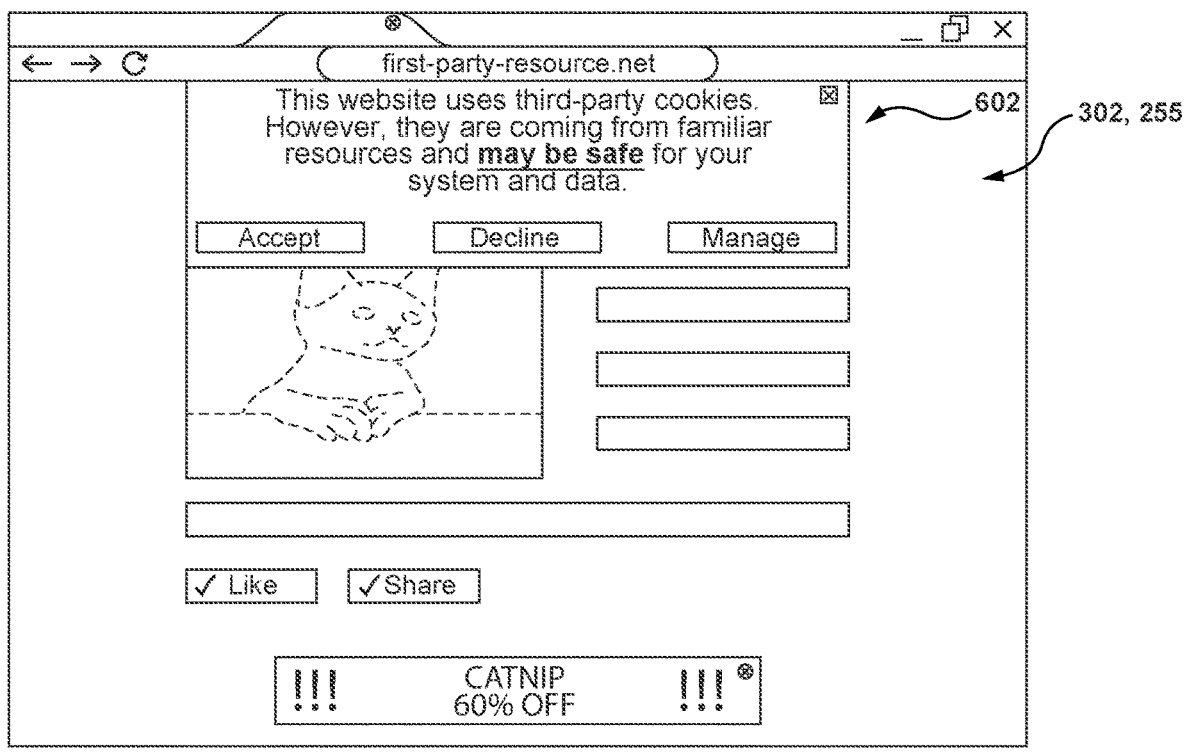
FIG. 6 depicts a schematic diagram of the given web page of FIG. 3 including a first notification generated by the electronic device present in the networked computing environment of FIG. 2 for the user thereof based on the probability value determined using the trained machine-learning model architecture of FIG. 4, in accordance with certain non-limiting embodiments of the present technology.

To that end, with reference to FIG. 6, in some non-limiting embodiments of the present technology, the first electronic device 210 can further be configured to cause the browser application 215 to generate a first notification 602. As it can be appreciated, the first notification 602 can inform the first user 211 that they may accept receipt of the respective third-party cookie from the third-party server 260. In alternative non-limiting embodiments of the present technology, in response to the first probability value being equal to or greater than the probability threshold value, the first electronic device 210 can be configured to cause the browser application 215 to accept receipt of the respective third-party cookie from the third-party server 260, automatically, without any notification.

However, in response to the first probability value being lower than the probability threshold value, the first electronic device 210 can be configured to determine that the first user 211 is unlikely to accept receipt of the respective third-party cookie from the third-party web resource 265 while browsing the given web page 302. Alternatively, the first electronic device 210 can be configured to determine that the first user 211 is likely to decline receipt of the respective third-party cookie.

Figure 7:
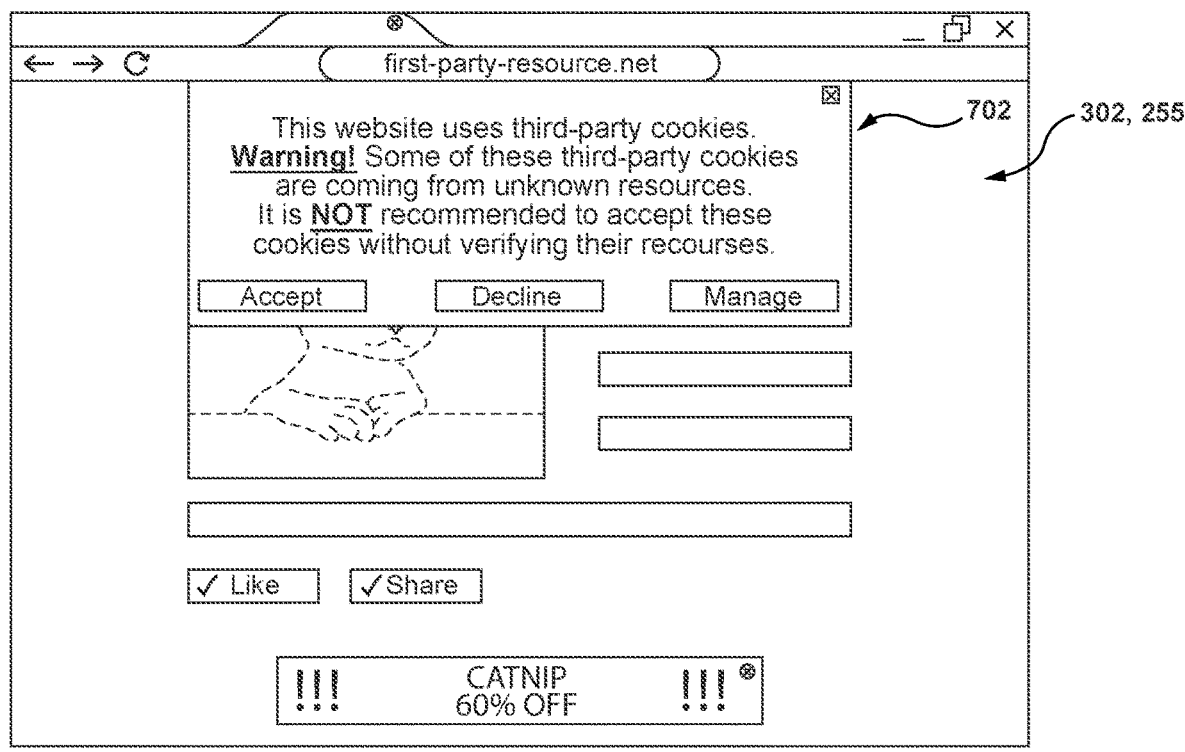
FIG. 7 depicts a schematic diagram of the given web page of FIG. 3 including a second notification generated by the electronic device present in the networked computing environment of FIG. 2 for the user thereof based on the probability value determined using the trained machine-learning model architecture of FIG. 4, in accordance with certain non-limiting embodiments of the present technology.

To that end, with reference to FIG. 7, in some non-limiting embodiments of the present technology, the first electronic device 210 can be configured to cause the browser application 215 to generate a second notification 702. As it can be appreciated, the second notification 702 can advise the first user 211 against accepting receipt of the respective third-party cookie from the third-party web server 260. In alternative non-limiting embodiments of the present technology, in response to the first probability value being lower than the probability threshold value, the first electronic device 210 can be configured to cause the browser application 215 to decline receipt of the respective third-party cookie from the third-party server 260 automatically, without any notification.

In yet other non-limiting embodiments of the present technology, the first electronic device 210 can be configured to cause the browser application 215 to execute the respective predetermined action only in response to determining that the first user 211 is unlikely to accept receipt of the respective third-party cookie. In other words, in these embodiments, (i) in response to the first probability value being equal to or greater than the probability threshold value, the first electronic device 210 can be configured to cause the browser application 215 to accept receipt of the respective third-party cookie automatically, without any notification; however, (ii) in response to the first probability value being lower than the probability threshold value, the first electronic device 210 can be configured to cause the browser application 215 to generate the second notification 702 advising the first user 211 against accepting receipt of the respective third-party cookie from the third-party web server 260.

However, in other non-limiting embodiments of the present technology, the first electronic device 210 can be configured to execute the respective predetermined actions differently based on the first probability value. For example, having determined the first probability value, the first electronic device 210 can be configured to compare it with different probability threshold values, including, for example, a lower predetermined threshold value, a middle predetermined threshold value, and a higher predetermined threshold value, each of which is higher than a preceding one. For example, the lower predetermined threshold value can be 0.75, the middle predetermined threshold value 0.85, and the higher predetermined threshold value can be 0.95. Thus, in some non-limiting embodiments of the present technology, in response to the first probability value being between the middle and the higher predetermined threshold values, the first electronic device 210 can be configured to cause the browser application 215 to generate the first notification 602. However, in response to the first probability value being equal to or greater than the higher predetermined threshold value, the first electronic device 210 can be configured to cause the browser application 215 to accept receipt of the respective third-party cookie from the third-party web server 260 automatically, without any notification.

By contrast, in some non-limiting embodiments of the present technology, in response to the first probability value being between the middle and the lower predetermined threshold values, the first electronic device 210 can be configured to cause the browser application 215 to generate the second notification 702. However, in response to the first probability value being lower than the lower predetermined threshold value, the first electronic device 210 can be configured to cause the browser application 215 to decline receipt of the respective third-party cookie from the third-party web server 260 automatically, without any notification.

Further, referring back to FIG. 2, similar to how the first electronic device 210 can be configured to generate the first probability value associated with the first user 211, in some non-limiting embodiments of the present technology, the second electronic device 212 can be configured to use the MLA formula 285 to determine a second probability value of the second user 213 accepting receipt of the respective third-party cookie from the third-party web server 260 while browsing the given web page 302. To that end, the second electronic device 212 can be configured to obtain second in-use data including at least one of: (i) second in-use user-specific data of the second user 213, similar to the first user-specific data of the first user 211, as described above; and (ii) the in-use third-party web resource-specific data of the third-party web resource 265 hosted by the third-party web server 260.

Thus, as in general case, the second user-specific data of the second user differs from the first-user specific data of the first user 211, the second electronic device 212 can be configured to determine, using the MLA formula 285, the second probability value which is different from the first probability value. Further, based on the second probability value, the second electronic device 212 can be configured to execute the respective predetermined action in a similar fashion as described above with respect to the first electronic device 210, such as generating one of the first and second notifications 602, 702, or accepting/declining receipt of the respective third-party cookie from the third-party web server 260 automatically.

In so doing, the present systems and methods may allow providing a uniquely customized recommendation and/or decision with respect to accepting or declining receipt of the respective third-party cookie from the third-party web server 260 for each user of the communication network 240, such as the first user 211 and the second user 213.

Additionally, in those embodiments where the respective third-party cookie has been previously received from the third-party web server 260 by one of the first electronic device 210, for example, the first electronic device 210 can be configured to receive, from the training server 270, the second MLA formula. Further, the first electronic device 210 can be configured to apply the second MLA formula to the first in-use feature vector to determine a third probability value of the first user 211 allowing sharing the respective third-party cookie with the third-party web server 260. Similarly, the first electronic device 210 can further be configured to compare the third probability value to a second predetermined probability threshold value; and based on this comparison, execute the respective predetermined action. For example, akin to the first probability value, based on the third probability value, the first electronic device 210 can be configured to cause the browser application 215 to generate a respective configuration of one of the first and second notifications 602, 702 advising that the first user 211 allow or refuse sharing the respective third-party cookie with the third-party web server 260, respectively.

However, it should be expressly understood that other predetermined actions, such as automatic sharing or automatic prevention of sharing the respective third-party cookie by the first electronic device 210 are also envisioned. Also, it should be noted that the first electronic device 210 can be configured to execute such predetermined actions in a similar fashion described in detail above with respect to the embodiments directed to determining the first probability value of the first user 211 accepting receipt of the respective third-party cookie.

Needless to say that, similar to determining the second probability value, using the second MLA formula, the second electronic device 212 can be configured to determine a fourth probability value of the second user 213 allowing sharing the respective third-party cookie with the third-party server 260, which will be different from the third probability value associated with the first user 211.

Further, in accordance with certain non-limiting embodiments of the present technology, after executing the respective predetermined action as described above, the first electronic device 210 can be configured to: (1) monitor further user actions of the first user 211 in response to providing a given one of the first notification 602 and the second notification 702; and (2) in response to a given further user action not corresponding to the given one of the first notification 602 and the second notification 702, transmit an indication of the given further user action to the training server 270 for updating the training set of data used for training the MLA 275. For example, with back reference to FIG. 6, in some non-limiting embodiments of the present technology, in response to determining that, notwithstanding the first notification 602, the first user 211 has declined the respective third-party cookie, the first electronic device 210 can be configured to generate an additional training digital object, including: (i) the first in-use user-specific data of the first user 211; (ii) the in-use third-party web resource-specific data of the third-party web resource 265; and (iii) a respective in-use label indicative of the first user 211 having declined the respective third-party cookie from the third-party web server 260. Further, in some non-limiting embodiments of the present technology, the first electronic device 210 can be configured to transmit, via the communication network 240, the additional training digital object to the training server 270 for updating the plurality of training digital objects used for training the MLA 275, as described above. By so doing, the training server 270 can be configured to update the MLA formula 285 from time to time, which can increase accuracy thereof for determining the respective probability values for the users of the communication network 240.

Also, although the in-use process as described above is executed by the first and second electronic devices 210, 212 using one of the MLA formula 285 and the second MLA formula transmitted thereto by the training server 270, it should be expressly understood that in other non-limiting embodiments of the present technology, the in-use process can also be executed by the training server 270, based on the first and second in-use data transmitted thereto from the first and second electronic devices 210, 212, respectively. In these embodiments, in response to receiving a given one of the first and second in-use data, the training server 270 can further be configured to determine a respective one of the first and second probability value for transmission thereof back to the first and second electronic devices 210, 212, respectively, as an example.

First Method

Figure 8:
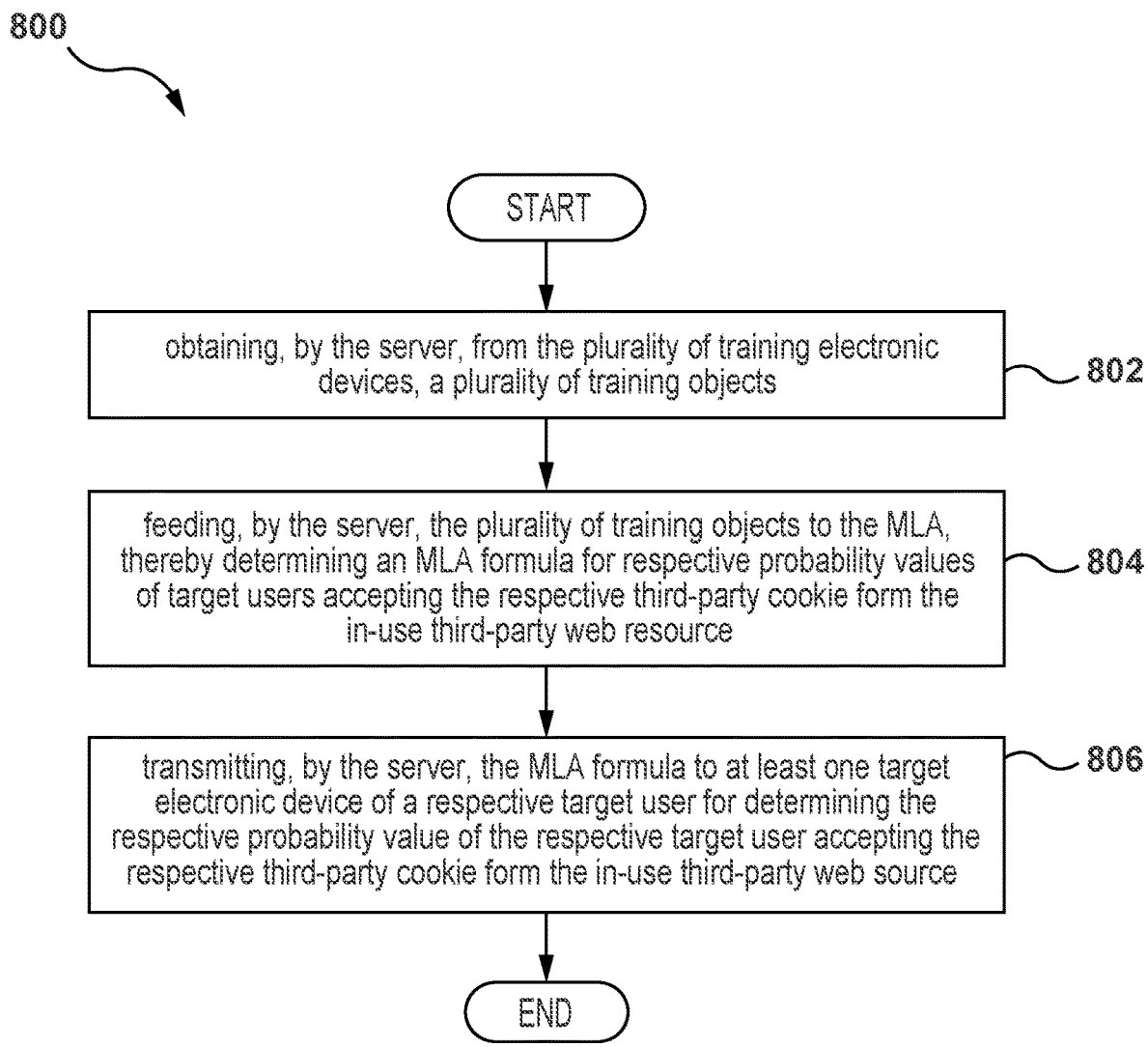
FIG. 8 depicts a flowchart diagram of a first method of training the machine-learning model architecture of FIG. 4 to determine the probability value of the user of the electronic device present in the networked computing environment of FIG. 2 accepting the third-party cookie from the third-party web resource wile browsing the given web page of FIG. 3, in accordance with certain non-limiting embodiments of the present technology.

Given the architecture and the examples provided hereinabove, it is possible to execute a method for training an MLA, such as the MLA 275, to determine the respective probability values of target users of the communication network 240, such as one of the first user 211 and the second user 213, accepting receipt of third-party cookies while browsing the given web page 302, as described above. With reference now to FIG. 8, there is depicted a flowchart of a first method 800, according to the non-limiting embodiments of the present technology. The first method 800 may be executed by the processor 110 of the training server 270.

Step 802: Obtaining, by the Server, from the Plurality of Training Electronic Devices, a Plurality of Training Objects The first method 800 commences at step 802 with the training server 270 being configured to obtain, from the plurality of training electronic devices coupled thereto, the plurality of training digital objects, as described above with reference to FIG. 5. As mentioned further above, in some non-limiting embodiments of the present technology, the training server 270 can be configured to obtain the plurality of training digital objects by accessing any electronic devices coupled to the communication network 240. However, in other non-limiting embodiments of the present technology, the training electronic devices can be associated with the plurality of training users 509 being human assessors specifically instructed to visit various training web pages and determine whether the respective third-party cookies should be accepted or declined.

More specifically, as also mentioned above with reference to FIG. 5, in certain non-limiting embodiments of the present technology, the given training digital object 512 of the plurality of training digital objects can comprise: (i) the training third-party web resource-specific data of the respective training third-party web resource 504, which is linked to the given training web page 502; (ii) the training user-specific data of the given training user 511 browsing the given training web page 502; and (iii) the respective label 505 indicative of whether the given training user 511 has accepted or declined receipt of the respective training third-party cookie from the respective training third-party web resource 504 while browsing the given training web page 502.

However, in those embodiments of the present technology, where the training server 270 is configured to train the MLA 275 to determine the probability value of the first user 211 allowing sharing the respective third-party cookie, previously received by the first electronic device 210, with the third-party web server 260, the training server 270 can be configured to organize the training data differently. More specifically, instead of the plurality of training digital objects described above, the training server 270 can be configured to generate, based on the data of the past user interactions of the training users, such as the given training user 511 mentioned above, the second plurality of training digital objects, a given training digital object of which differs from the given training digital object 512 only in the configuration of the respective label assigned.

More specifically, the respective label assigned to the given training digital object of the second plurality of training digital objects is indicative of whether the given training user 511 has allowed or refused sharing the respective training third-party cookie, previously received by the given training electronic device 510 from the respective training third-party web resource 504, with the respective training third-party web server thereof, while browsing the given training web page 502.

The first method 800 hence advances to step 804.

Step 804: Feeding, by the Server, the Plurality of Training Objects to the MLA, Thereby Determining an MLA Formula for Respective Probability Values of Target Users Accepting Receipt of the Respective Third-Party Cookie Form the In-Use Third-Party Web Resource Further, at step 804, the training server 270 can be configured to feed the so obtained plurality of training digital objects to the MLA 275, thereby training the MLA 275 to determine the respective probability values of the first user 211 and the second user 213 accepting receipt of the respective third-party cookie from the third-party web server 260 while browsing the given web page 302.

To that end, in those non-limiting embodiments of the present technology, where the MLA 275 is an ensemble of decision trees, as described above with reference to FIG. 4, the training server 270 can be configured to sequentially descend each one of the plurality of training digital objects through branches of each one of the ensemble of decision trees, thereby determining the splits between the nodes within the given one of the ensemble of decision trees.

Further, using, for example, the boosting approach to forming the ensemble of decision trees, as described further above with reference to FIG. 4, the training server 270 can be configured to minimize the loss function between the outputs of the ensemble, at a current iteration of generation thereof, and the targets thereof represented by respective labels assigned to each one of the plurality of training digital objects as described above.

By doing so, the training server 270 can be configured to train the MLA 275, thereby determining the MLA formula 285 for the respective probability values of whether the first user 211 and the second user 213 would accept receipt of the respective third-party cookie form the third-party web server 260 while browsing the given web page 302.

Accordingly, based on the second plurality of training digital objects, the training server 270 can be configured to train the MLA 275 to determine the second MLA formula for the respective probability value of whether a given user of the communication network 240, such as one of the first user 211 and the second user 213, would allow or refuse sharing the respective third-party cookie with the third-party web server 260, previously received therefrom, while browsing the given web page 302.

The first method thus proceeds to step 806.

Step 806: Transmitting, by the Server, the MLA Formula to at Least One Target Electronic Device of a Respective Target User for Determining the Respective Probability Value of the Respective Target User Accepting Receipt of the Respective Third-Party Cookie Form the In-Use Third-Party Web Resource Finally, at step 806, the training server 270 can be configured to transmit at least one of the MLA formula 285 and the second MLA formula to each one of the first electronic device 210 and the second electronic device 212 for further use in determining the respective probability values described above.

The first method 800 thus terminates

Second Method

Figure 9:
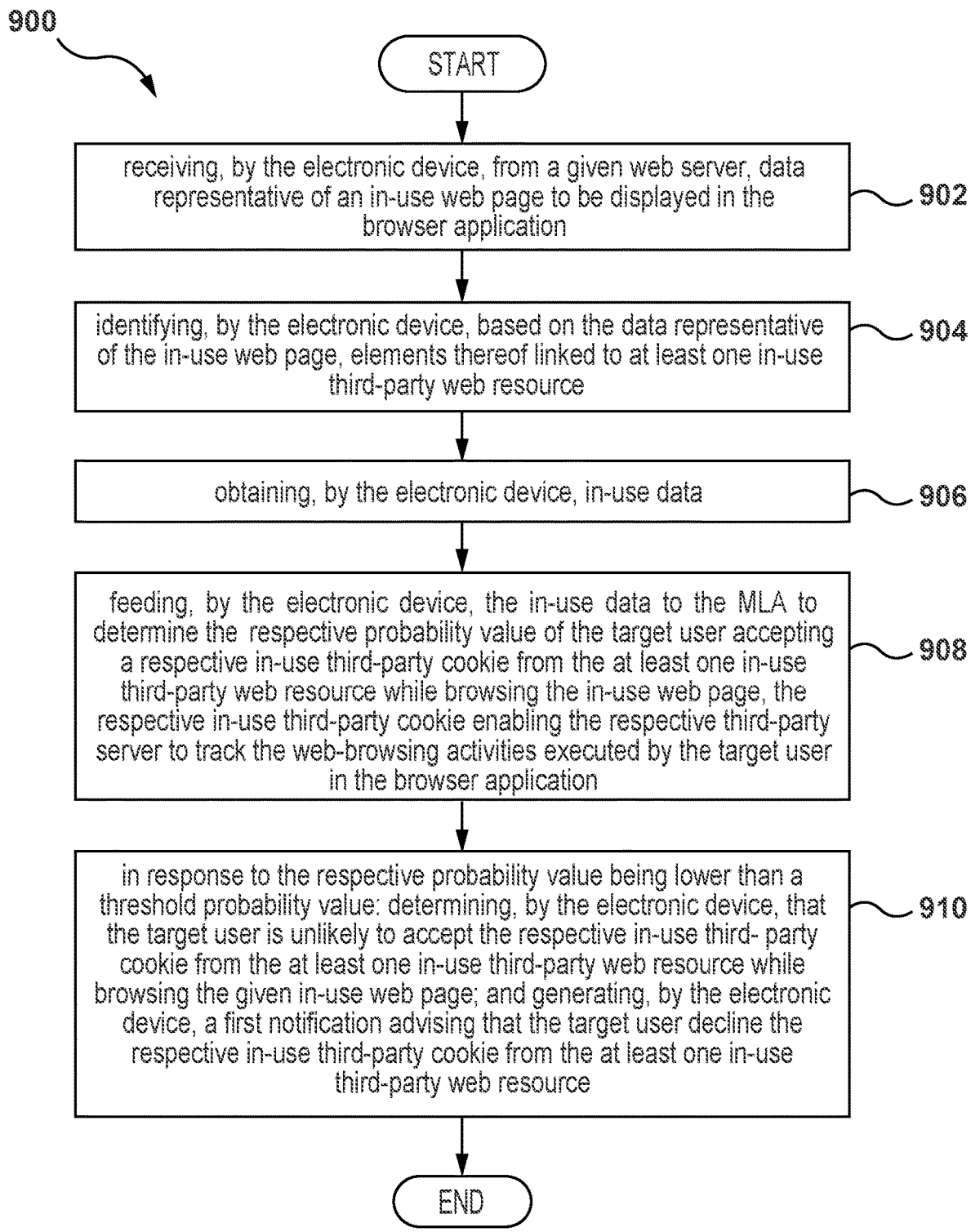
FIG. 9 depicts a flowchart diagram of a second method of controlling tracking of web-browsing activity of the user of the electronic device present in the networked computing environment of FIG. 2 using the machine-learning model architecture of FIG. 4 trained in accordance with the first method of FIG. 8, in accordance with certain non-limiting embodiments of the present technology.

Given the architecture and the examples provided hereinabove, it is possible to execute a method for controlling tracking of web-browsing activities executed by a target user in a browser application, such as that of the first user 211 in the browser application 215 run by the first electronic device 210, as described above. With reference now to FIG. 9, there is depicted a flowchart of a second method 900, according to the non-limiting embodiments of the present technology.

The second method 900 may be executed by the processor 110 of the first electronic device 210, as an example.

Step 902: Receiving, by the Electronic Device, from a Given Web Server, Data Representative of an In-Use Web Page to be Displayed in the Browser Application The second method 900 commences at step 902 with the first electronic device 210 being configured, such in response to the first user 211 submitting the associated URL to the address bar of the browser application 215, to receive, from the first-party web server 250, the executable source code of the given web page 302 of the given web resource 255. Further, the first electronic device 210 can be configured to cause the browser application 215 to render the visual representation of the given web page 302 for presentation thereof to the first user 211, as schematically depicted in FIG. 3.

Further, as mentioned above, examples of the given web resource 255 including the given web page 302 may include, without limitation, a web site, such as a commercial web site aimed at promoting certain goods, a news portal (such as RIA Novosti™ or CNN™, for example), an online video service (for example, Kinopoisk.ru™), and the like.

The second method 900 hence advances to step 904.

Step 904: Identifying, by the Electronic Device, Based on the Data Representative of the In-Use Web Page, Elements Thereof Linked to at Least One In-Use Third-Party Web Resource At step 904, according to certain non-limiting embodiments of the present technology, as described above with reference to FIG. 3, the first electronic device 210 can be configured to identify, within the plurality of layout element forming defining the given web page 302, the third-party elements 308, such as the given third-party element 309. As noted above, the given third-party layout 309 can be representative of the content of the third-party web resource 265 hosted by the third-party web server 260, which is different from the first-party web server 250 hosting the given web resource 255. Thus, the third-party web resource 265 can be linked to the given web of the present specification, it is meant that the given third-party element 309 can be configured to at least one of: (i) redirect the first user 211 browsing the given web page 302 to a respective web page of the third-party web resource 265 in response to a predetermined interaction of the first user 211 with the given third-party element 309, such as clicking thereon; and (2) transmit, to the third-party web server 260, certain data indicative of interactions with one of the given third-party element 309 only and/or with the given web page 302 in its entirety.

Further, according to certain non-limiting embodiments of the present technology, the given web resource 255 can be configured to use cookies, including third-party cookies, such as the respective third-party cookie of the third-party web server 260 that can be transmitted to the first electronic device 210. Thus, by transmitting the respective third-party cookie to the first electronic device 210, the third-party web server 260 can be configured to track the web-browsing activity of the first user 211 including, for example, without limitation, (i) web-browsing history of the first user 211, (ii) clicking on buttons or following links on various web pages, (iii) search activities executed on search engines; and (iv) logging in/off on various resources, such as email web services, social networks, and the like. In additional non-limiting embodiments of the present technology, the data that can be available to the third-party web server 260 via the respective third-party cookie can further include data of the first electronic device 210, including, without limitation (i) a model of the first electronic device 210; (ii) data of an operating system thereof, such as versions, dates of last updates, and the like; (iii) data from sensors of the first electronic device 210, such as GPS data, for example; and others.

As sharing such data with third-party web servers can pose privacy risks for the first user 211, the second method 900 proceeds to further steps to determine whether the first user 211 should block or accept receipt of the respective third-party cookie from the third-party web server 260.

The second method 900 hence advances to step 906.

Step 906: Obtaining, by the Electronic Device, In-Use Data

At step 906, the first electronic device 210 can be configured to obtain the first in-use data including at least one of the first user-specific data of the first user 211 and the third-party web resource-specific data of the third-party web resource 265 hosted by the third-party web server 260, as described above with respect to the in-use process of operating the MLA 275.

The second method 900 hence advances to step 908.

Step 908: Feeding, by the Electronic Device, the In-Use Data to the MLA to Determine the Respective Probability Value of the Target User Accepting Receipt of a Respective In-Use Third-Party Cookie from the at Least One In-Use Third-Party Web Resource while Browsing the In-Use Web Page, the Respective In-Use Third-Party Cookie Enabling the Respective Third-Party Server to Track the Web-Browsing Activities Executed by the Target User in the Browser Application At step 908, according to certain non-limiting embodiments of the present technology, the first electronic device 210 can be configured to apply, to the first in-use data obtained at the previous step, the MLA 275 trained in accordance with the first method 800 as described above. To that end, in some non-limiting embodiments of the present technology, the first electronic device 210 can be configured to receive, from the training server 270, the MLA formula 285 generated by the MLA 275 as a result of the first method 800.

Further, the first electronic device 210 can be configured to apply the MLA formula 285 to the first in-use data to generate the first probability value if the first user 211 accepting receipt of the respective third-party cookie from the third-party web server 260 while browsing the given web page 302. As mentioned above, accepting receipt of the respective third-party cookie by the first user 211 can enable the third-party web server 260 to track the web-browsing activity of the first user 211.

However, in other non-limiting embodiments of the present technology, to determine the first probability value associated with the first user 211, first, the first electronic device 210 can be configured to transmit, via the communication network 240, the first in-use data to the training server 270. In response, the training server 270 can be configured to apply the MLA formula 285 to the first in-use data to determine the first probability value and further transmit the first probability value back to the first electronic device 210.

As noted above, the second electronic device 212 can also be configured to receive, from the training server 270, the MLA formula 285 to determine, based on the second in-use data, the second probability value of the second user 213 accepting receipt of the respective third-party cookie from the third-party web server 260 while browsing the given web page 302. As it can be appreciated, as determined based on different in-use data, the second probability value can be different from the first probability value.

The second method 900 thus proceeds to step 910.

Step 910: In Response to the Respective Probability Value being Lower than a Threshold Probability Value: Determining, by the Electronic Device, that the Target User is Unlikely to Accept Receipt of the Respective In-Use Third-Party Cookie from the at Least One In-Use Third-Party Web Resource while Browsing the Given In-Use Web Page; and Generating, by the Electronic Device, a First Notification Advising that the Target User Decline Receipt of the Respective In-Use Third-Party Cookie from the at Least One in-Use Third-Party Web Resource Finally, at step 910, based on the first probability value, the first electronic device 210 can be configured to (i) determine if the first user 211 is likely to accept or decline receipt of the respective third-party cookie from the third-party web server 260; and (ii) execute the respective predetermined action.

For example, in response to determining that the first probability value being equal to or greater than the predetermined threshold probability value, the first electronic device 210 can be configured to determine that the first user 211 is likely to accept the respective third-party cookie from the third-party web server 260.

To that end, in some non-limiting embodiments of the present technology, as described above with reference to FIG. 6, the first electronic device 210 can be configured to cause the browser application 215 to generate the first notification 602 advising that accepting receipt of the respective third-party cookie from the third-party server 260 is safe for the privacy of data of the first user 211. In other non-limiting embodiments of the present technology, in response to the first probability value being equal to or greater than the probability threshold value, the first electronic device 210 can be configured to cause the browser application 215 to accept receipt of the respective third-party cookie from the third-party server 260, automatically, without any notification.

By contrast, in response to determining that the first probability value being lower than the probability threshold value, the first electronic device 210 can be configured to determine that the first user 211 is unlikely to accept receipt of the respective third-party cookie from the third-party web resource 265 while browsing the given web page 302. Alternatively, the first electronic device 210 can be configured to determine that the first user 211 is likely to decline receipt of the respective third-party cookie.

To that end, in some non-limiting embodiments of the present technology, as described above with reference to FIG. 7, the first electronic device 210 can be configured to cause the browser application 215 to generate the second notification 702 advising that the first user 211 decline receipt of the respective third-party cookie from the third-party web resource 265.

In some non-limiting embodiments of the present technology, the first electronic device 210 can be configured to cause the browser application 215 to execute the respective predetermined action only in response to determining that the first user 211 is unlikely to accept receipt of the respective third-party cookie. In other words, in these embodiments, (i) in response to the first probability value being equal to or greater than the probability threshold value, the first electronic device 210 can be configured to cause the browser application 215 to accept receipt of the respective third-party cookie automatically, without any notification; however, (ii) in response to the first probability value being lower than the probability threshold value, the first electronic device 210 can be configured to cause the browser application 215 to generate the second notification 702 advising the first user 211 against accepting receipt of the respective third-party cookie from the third-party web server 260.

Further, in accordance with certain non-limiting embodiments of the present technology, after executing the respective predetermined action as described above, the first electronic device 210 can be configured to: (1) monitor further user actions of the first user 211 in response to providing a given one of the first notification 602 and the second notification 702; and (2) in response to a given further user action not corresponding to the given one of the first notification 602 and the second notification 702, transmit an indication of the given further user action to the training server 270 for updating the training set of data used for training the MLA 275. More specifically, as mentioned further above with reference to FIG. 6, in some non-limiting embodiments of the present technology, in response to determining that, notwithstanding the first notification 602, the first user 211 has declined the respective third-party cookie, the first electronic device 210 can be configured to generate an additional training digital object, including: (i) the first in-use user-specific data of the first user 211; (ii) the in-use third-party web resource-specific data of the third-party web resource 265; and (iii) a respective in-use label indicative of the first user 211 having declined the respective third-party cookie from the third-party web server 260. Further, in some non-limiting embodiments of the present technology, the first electronic device 210 can be configured to transmit, via the communication network 240, the additional training digital object to the training server 270 for updating the plurality of training digital objects used for training the MLA 275, as described above. By so doing, the training server 270 can be configured to update the MLA formula 285 from time to time, which can increase accuracy thereof for determining the respective probability values for the users of the communication network 240.

Additionally, in some non-limiting embodiments of the present technology, each one of the first electronic device 210 and the second electronic device 212 can be configured to receive, from the training server 270, the second MLA formula. Further, the first electronic device, for example, can be configured to apply the second MLA formula to the first in-use feature vector to determine a third probability value of the first user 211 allowing sharing the respective third-party cookie, previously received by the first electronic device 210, with the third-party web server 260. Similarly, the first electronic device 210 can further be configured to compare the third probability value to a second predetermined probability threshold value; and based on this comparison, execute a respective predetermined action. For example, based on the third probability value, the first electronic device 210 can be configured to cause the browser application 215 to generate a respective configuration of one of the first and second notifications 602, 702 advising that the first user 211 allow or refuse sharing the respective third-party cookie with the third-party web server 260, respectively.

However, it should be expressly understood that other predetermined actions, such as automatic sharing or automatic prevention of sharing the respective third-party cookie by the first electronic device 210 are also envisioned. The first electronic device 210 can be configured to execute such predetermined actions in a similar fashion described in detail above with respect to the embodiments directed to determining the first probability value of the first user 211 accepting receipt of the respective third-party cookie.

Needless to say that, similar to determining the second probability value, using the second MLA formula, the second electronic device can be configured to determine a fourth probability value of the second user 213 allowing sharing the respective third-party cookie with the third-party server 260, which will be different from the third probability value associated with the first user 211.

The second method 900 thus terminates.

Thus, certain non-limiting embodiments of the second method 900 are directed to providing uniquely customized recommendations with respect to whether accept or decline receipt of the third-party cookies to different users of the communication network 240.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implementable method for controlling tracking of web-browsing activities executed by a target user in a browser application run by an electronic device, the electronic device being communicatively coupled to a server executing a machine-learning algorithm (MLA), the MLA having been trained to determine respective probability values of a given in-use user allowing sharing third-party cookies of in-use third-party web resources therewith while browsing respective in-use web pages, the respective in-use web pages having elements linked to the in-use third-party web resources, the MLA having been trained based on a training set of data including a plurality of training objects, a given training object of the plurality of training objects comprising:

(i) training third-party web resource-specific data of a training third-party web resource, the training third-party web resource being linked to a respective training web page;

(ii) training user-specific data of a given training user browsing the respective training web page, the training user-specific data including data of past user interactions of the given training user with the training third-party web resource; and (iii) a respective label indicative of whether the given training user has allowed or refused sharing a respective training third-party cookie of the training third-party web resource with the training third-party web resource while browsing the respective training web page including elements linked to the training third-party web resource, the respective training third-party cookie having been previously received by a training electronic device of the given training user;

the method comprising:

receiving, from a given web server, data representative of an in-use web page to be displayed in the browser application;

identifying, based on the data representative of the in-use web page, elements thereof linked to at least one in-use third-party web resource of the in-use third-party web resources, a given element being configured to transmit data of interactions therewith to a respective third-party web server hosting the at least one in-use third-party web resource, different from the given web server;

obtaining in-use data including at least one of:
 (i) user-specific data of the target user including data of past user interactions of the target user with the at least one in-use third-party web resource; and
 (ii) third-party web resource-specific data of the at least one in-use third-party web resource;

feeding the in-use data to the MLA to determine a respective probability value of the target user allowing sharing a respective in-use third-party cookie of the at least one in-use third-party web resource with the at least one in-use third-party web resource while browsing the in-use web page, the respective in-use third-party cookie enabling the respective third-party web server to track the web-browsing activities executed by the target user in the browser application, the respective in-use third-party cookie having been previously received by the electronic device of the target user, the respective probability value of allowing sharing the respective in-use third-party cookie of the at least one in-use third-party web resource by the target user and by another target user that is different from the target user;

in response to the respective probability value being lower than a threshold probability value:
 determining that the target user is unlikely to share the respective in-use third-party cookie with the at least one in-use third-party web resource while browsing the given in-use web page; and
 generating a first notification advising that the target user refuse sharing the respective in-use third-party cookie with the at least one in-use third-party web resource.

2. The method of claim 1, wherein in response to the probability value being lower than the threshold probability value, the method further comprises causing the browser application to prevent sharing the respective third-party cookie with the at least one in-use third-party web resource.

3. The method of claim 1, wherein in response to the probability value being equal to or greater than the threshold probability value, the method further comprises:
 determining that the target user is likely to allow sharing the respective third-party cookie with the at least one in-use third-party web resource; and
 generating a second notification advising that sharing the respective third-party cookie with the at least one in-use third-party web resource is safe.

4. The method of claim 3, wherein the method further comprises:
 receiving an indication of a user action of the target user responsive to a given one of the first notification and the second notification; and
 in response to the user action not corresponding to the given one of the first notification and the second notification, storing the indication of the user action for updating the training set of data for training the MLA.

5. The method of claim 1, wherein in response to the probability value being equal to or greater than the threshold probability value, the method further comprises causing the browser application to share the respective third-party cookie from the at least one in-use third-party web resource.

6. The method of claim 1, wherein the training third-party web resource data includes at least one of: a domain zone of the training third-party web resource; a domain name of the training third-party web resource; and a category of the training third-party web resource.

7. The method of claim 6, wherein the category of the training third-party web resource comprises at least one of: (i) a social network; (ii) a news portal; and (iii) a video hosting platform.

8. The method of claim 1, wherein the user-specific data of the target user further includes data of a current location of the target user.

9. The method of claim 1, wherein the server is communicatively coupled to another electronic device of the other target user, different from the electronic device, the other electronic device running another browser application, the other electronic device comprising at least one processor and at least one non-transitory computer-readable memory comprising executable instructions, which, when executed by the at least one processor, cause the other electronic device to execute:
 receiving, from the given web server, data representative of the in-use web page to be displayed in the other browser application;
 identifying, based on the data representative of the in-use web page, the elements thereof linked to the at least one in-use third-party web resource;
 obtaining, by the other electronic device, other in-use data including at least one of:
 (i) other user-specific data of the other user including data of past user interactions of the other target user with the at least one in-use third-party web resource; and
 (ii) the third-party web resource-specific data of the at least one in-use third-party web resource;
 feeding, the other in-use data to the MLA to determine another respective probability value of the other target user allowing sharing the respective in-use third-party cookie with the at least one in-use third-party web resource while browsing the in-use web page, the respective in-use third-party cookie enabling the respective third-party server to track the web-browsing activities executed by the other user in the other browser application, the respective in-use third-party cookie having been previously received by the other electronic device of the other target user, the other respective probability value of allowing sharing the respective in-use third-party cookie with the at least one in-use third-party web resource by the other target user being different from the respective probability value determined for the target user; and
 in response to the other respective probability value being lower than the threshold probability value:
 determining that the other target user is unlikely to allow sharing the respective in-use third-party cookie with the at least one in-use third-party web resource while browsing the given in-use web page; and
 generating the first notification advising that the other target user refuse sharing the respective in-use third-party cookie with the at least one in-use third-party web resource.

10. The method of claim 1, wherein the MLA is a CatBoost decision tree-based MLA.

11. An electronic device for controlling tracking of web-browsing activities executed by a target user in a browser application of the electronic device, the electronic device being communicatively coupled to a server executing a machine-learning algorithm (MLA), the MLA having been trained to determine respective probability values of a given in-use user allowing sharing third-party cookies of in-use third-party web resources therewith while browsing respective in-use web pages, the respective in-use web pages having elements linked to the in-use third-party web resources, the MLA having been trained based on a training set of data including a plurality of training objects, a given training object of the plurality of training objects comprising:
- (i) training third-party web resource-specific data of a training third-party web resource, the training third-party web resource being linked to a respective training web page;
- (ii) training user-specific data of a given training user browsing the respective training web page, the training user-specific data including data of past user interactions of the given training user with the training third-party web resource; and
- (iii) a respective label indicative of whether the given training user has allowed or refused sharing a respective training third-party cookie of the training third-party web resource with the training third-party web resource while browsing the respective training web page including elements linked to the training third-party web resource, the respective training third-party cookie having been previously received by a training electronic device of the given training user;

the electronic device comprising:

at least one processor and at least one non-transitory computer-readable medium comprising executable instructions, which, when executed by the at least one processor, cause the electronic device to:

receive, from a given web server, data representative of an in-use web page to be displayed in the browser application;

identify, based on the data representative of the in-use web page, elements thereof linked to at least one in-use third-party web resource of the in-use third-party web resources, a given element being configured to transmit data of interactions therewith to a respective third-party web server hosting the at least one in-use third-party web resource, different from the given web server;

obtain in-use data including at least one of:
- (i) user-specific data of the target user including data of past user interactions of the target user with the at least one in-use third-party web resource; and
- (ii) third-party web resource-specific data of the at least one in-use third-party web resource;

feed the in-use data to the MLA to determine a respective probability value of the target user allowing sharing a respective in-use third-party cookie of the at least one in-use third-party web resource with the at least one in-use third-party web resource while browsing the in-use web page, the respective in-use third-party cookie enabling the respective third-party web server to track the web-browsing activities executed by the target user in the browser application, the respective in-use third-party cookie having been previously received by the electronic device of the target user, the respective probability value of allowing sharing the respective in-use third-party cookie of the at least one in-use third-party web resource by the target user and by another target user that is different from the target user;

in response to the respective probability value being lower than a threshold probability value:

determine that the target user is unlikely to share the respective in-use third-party cookie with the at least one in-use third-party web resource while browsing the given in-use web page; and generate a first notification advising that the target user refuse sharing the respective in-use third-party cookie with the at least one in-use third-party web resource.

12. The electronic device of claim 11, wherein in response to the probability value being lower than the threshold probability value, the at least one processor further causes the electronic device to cause the browser application to prevent sharing the respective third-party cookie with the at least one in-use third-party web resource.

13. The electronic device of claim 11, wherein in response to the probability value being equal to or greater than the threshold probability value, the at least one processor further causes the electronic device to:

determine that the target user is likely to allow sharing the respective third-party cookie with the at least one in-use third-party web resource; and generate a second notification advising that sharing the respective third-party cookie with the at least one in-use third-party web resource is safe.

14. The electronic device of claim 13, wherein the at least one processor further causes the electronic device to:

receive an indication of a user action of the target user responsive to a given one of the first notification and the second notification; and in response to the user action not corresponding to the given one of the first notification and the second notification, store the indication of the user action for updating the training set of data for training the MLA.

15. The electronic device of claim 11, wherein in response to the probability value being equal to or greater than the threshold probability value, the at least one processor further causes the electronic device to cause the browser application to share the respective third-party cookie from the at least one in-use third-party web resource.

16. The electronic device of claim 11, wherein the training third-party web resource data includes at least one of: a domain zone of the training third-party web resource; a domain name of the training third-party web resource; and a category of the training third-party web resource.

* * * * *